(12) United States Patent
Schleifer et al.

(10) Patent No.: US 10,783,017 B2
(45) Date of Patent: Sep. 22, 2020

(54) SYSTEM AND METHOD FOR INTEGRATING MULTIPLE APPLICATIONS

(71) Applicant: ChartIQ, Inc., Charlottesville, VA (US)

(72) Inventors: Daniel Gary Schleifer, Charlottesville, VA (US); Siddharth Gautam Dalal, Charlottesville, VA (US); Bradley Stewart Carter, Charlottesville, VA (US); Terrence Russell Thorsen, Charlottesville, VA (US); Michael Hugh McClung, Ruckersville, VA (US); Ryan Christopher Sharp, Charlottesville, VA (US)

(73) Assignee: ChartIQ, Inc., Charlottesville, VA (US)

( * ) Notice: Subject to any disclaimer, the term of this patent is extended or adjusted under 35 U.S.C. 154(b) by 67 days.

(21) Appl. No.: 15/980,981

(22) Filed: May 16, 2018

(65) Prior Publication Data
US 2019/0354416 A1 Nov. 21, 2019

(51) Int. Cl.
*G06F 9/54* (2006.01)
(52) U.S. Cl.
CPC .................................. *G06F 9/547* (2013.01)
(58) Field of Classification Search
None
See application file for complete search history.

(56) References Cited

U.S. PATENT DOCUMENTS

| 7,805,730 | B2 | 9/2010 | Holmes et al. | |
|---|---|---|---|---|
| 2004/0205552 | A1* | 10/2004 | Vosburgh | G06F 16/86 715/215 |
| 2016/0127199 | A1* | 5/2016 | Ding | H04L 41/5051 709/226 |

(Continued)

OTHER PUBLICATIONS

Coverpage of website showing Video clip "The Financial Desktop Reimagined" of presentation delivery at FinJS NY-2017 Conference. https://www.youtube.com/watch?v=d0dYAJJh7ws. Mar. 22, 2017.

(Continued)

*Primary Examiner* — Chat C Do
*Assistant Examiner* — William C Wood
(74) *Attorney, Agent, or Firm* — Bechen PLLC; Timothy J. Bechen

(57) ABSTRACT

A method and system for interoperability between mark-up language applications executable within a browser container, including accessing exchange scripts in each application and executing a microservices module in communication with the first application and the second application, the microservices module disposed between the applications and the browser container. The method and system, based on an interaction between the first application and the microservices module, emits a strand including both a data field and a command field. The method and system accessing a rules engine to determine at least one rule associated with the strand, generates modified strand based on the at least one rule and broadcasting the modified strand to the second application via the second exchange script, and converts the modified strand to an action command and performing a processing operation in the second application based on the action command.

17 Claims, 12 Drawing Sheets

(56) References Cited

U.S. PATENT DOCUMENTS

| | | | |
|---|---|---|---|
| 2017/0078452 | A1 | 3/2017 | Verrjit et al. |
| 2017/0115829 | A1 | 4/2017 | Al-Alami et al. |
| 2017/0206365 | A1* | 7/2017 | Garcia ............... G06F 21/6245 |
| 2017/0228359 | A1 | 8/2017 | Cuzzort |
| 2017/0329505 | A1 | 11/2017 | Richter et al. |
| 2018/0152534 | A1* | 5/2018 | Kristiansson ........... H04L 67/16 |
| 2019/0098106 | A1* | 3/2019 | Mungel ............... H04L 67/2838 |

OTHER PUBLICATIONS

Transcript of video clip The Financial Desktop Reimagined of presentation delivery at FinJS NY-2017 Conference. https://www.youtube.com/watch?v=d0dYAJJh7ws. Mar. 22, 2017.

Finsemble Seed Code (https://github/ChartIQ/finsemble-seed/blob/b9b1e55a74237ba10a799274b2b2e75abb6aeba2), access date Sep. 16, 2019.

Finsemble Seed Code/accountDetail.js (https://github.com/ChartIQ/finsemble-seed/blob/b9b1e55a74237ba10a792274b2b2e75abb6aeba2/src/tutorials/accountDetail/accountDetail.js), Apr. 6, 2017.

Finsemble Seed Code/account/statement.js (https://github.com/ChartIQ/finsemble-seed/blob/b9b1e55a74237ba10a792274b2b2e75abb6aeba2/src/tutorials/accountStatement/accountStatement.js), Apr. 20, 2017.

Frederik De Keukelaere, Sumeer Bhola, Michael Steinr, Sursh Chari, Sachiko Yoshihama. "SMash: Secure Component Model for Cross-Doman Mashups on Unmodified Browsers." WWW 2008 Refereed Track: Security and Privacy, Apr. 21, 2008.

Horwood, Keith H. "In-browser multithreading made easy" (http://web.archive.org/web/20131119020324/http://facebook.github.io/react) 2013.

OpenF2 Code—release 1.4.3 (https://github.com/OpenF2/F2/releases/tag/1.4.3) May 11, 2017.

OpenF2 About (htttps://github.com/OpenF2/F2/blob/e0eb9a2491e233a0f930993bf90216d18cb64e44/docs/src/about-f2.md). Feb. 26, 2015.

OpenF2-Container Development (https://github.com/OpenF2/F2/blob/e0eb9a2491e233a0f930993bf90216d18cb64e44/docs/src/container-development.md). May 11, 2017.

OpenF2-App Development (https://github.com/OpenF2/F2/blob/e0eb9a2491e233a0f930993bf90216d18cb64e44/docs/src/app-development.md) Feb. 25, 2015.

OpenF2-applcass.js (https://github.com/OpenF2/F2/blob/e0eb9a2491e233a0f930993bf90216d18cb64e44/examples/apps/JavaScript/Chart/appclass.js). Nov. 18, 2014.

* cited by examiner

SYSTEM AND METHOD FOR INTEGRATING MULTIPLE APPLICATIONS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to software operations and more specifically to integrating applications operating in different processing platforms.

BACKGROUND

Computing platforms have long been well defined. The local processor runs the operating system (OS), wherein applications run thereon. OS-level modules allow for communication between these applications. For example, a clipboard allows cutting and pasting of text between applications.

While there have been improvements in desktop OS software and network connectivity, there are restrictions for executing applications operating within an OS based platform. For example, a common application for accessing network resources is a browser application. Browser applications read hypertext mark-up language (HTML) data files and enable executables for interacting with the HTML, for example Javascript. The combination of HTML text file(s) and executable code is referred herein as HTML solutions.

Current HTML solutions offer a limited view of interoperability. Browsers executing the HTML solutions engage between the local OS, such as through application program interfaces (APIs), and network microservices through transfer protocols. Current HTML solutions, extending through version four of HTML standards, referred to as HTML4, lack the ability for multiple browser applications to interact or interoperate without a network server. Browser applications and HTML solutions must maintain a secure sandbox.

The current trend in computing resources is the integration of HTML solutions into the space of desktop applications, operating on the local OS. Current HTML capabilities and architecture revolve around independently operating windows, each running in their own secure sandbox.

The new HTML standard, referred to as HTML5, has opened the ability for browser applications to interact and cross-communication directly. It is not realistic in the modern computing environment to rely on one or more servers for coordinating multiple browser windows. In addition to latency issues, you have to tie up a portion of server operations. There are security concerns as well as interoperability concerns between HTML solutions from different developers.

HTML5 enabled browser containers. A browser container includes at least a part of browser executable, enabling reading mark-up language and related executables, as well as operating system hooks. Browser containers allow for multiple applications to be run in separate browser windows.

In prior systems, a key reason for limiting browser interoperability is because security restrictions within a browser environment. Using browser containers allows for relaxing security restrictions, but current solutions do not facilitate interoperability of mark-up language applications executable within a browser container.

For example, current HTML5 applications can include pre-loaded scripts or have these scripts actively loaded therein. The scripts enable API communication between the application running in the browser and the browser container.

As HTML solutions migrate into the space of desktop applications, there is a need for enabling multiple mark-up language applications to execute in separate browser windows, as well as communicate with each other above the OS level.

Furthermore, as the emerging HTML solutions include stand-alone browser windows, there is a need for improving the management of these multiple windows for improving the user experience.

BRIEF DESCRIPTION

As the method and system provides for interoperability between mark-up language applications executing in browser containers, there are needs for improving how these applications interoperate. Because of secure sandbox architecture with browser applications, the present method and system improves interoperability between these applications.

A first application and a second application are both mark-up language applications executable within a browser container. The browser container includes at least a part of browser executable, enabling reading mark-up language and related executables, as well as operating system hooks.

The method and system includes accessing a first exchange script in the first application and a second exchange script in the second application. The method and system further includes executing a microservices module that is in communication with the first application and the second application. The microservices module is disposed between the applications and the browser container. Therein, the method and system provides for communicating between the first application and the microservices module using the first exchange scrip and communicating between the second application and the microservices module using the second exchange script.

The present method and system integrates an emitter and receptor communication model into the browser container environment, allowing for interoperability between applications. An emitter is a processing component that emits a strand and a receptor is a processing component that receives a strand. A strand, as used herein, is an electronic communication transmitted and shared between an emitter and any number of receptors, in one embodiment the strand includes a data field and a command field. It is further noted, as described below, receptors may also be emitters.

Due to the secure sandbox nature of browser applications, prior techniques were unable to use emitters/receptors between independent applications within a browser environment without the use of an external server. Rather, the present method and system utilizes the microservices module, allowing for enhanced interoperability with the emitters/receptors.

After the strand is emitted, the method and system includes accessing a rules engine in a microservices module to determine at least one rule associated with the strand. Therefrom, the method and system generates a modified strand and broadcasts the modified strand to the second application via the second exchange script. The second application may therein convert the modified strand to an action command and perform a processing operation based on the action command.

In additional embodiments, the strand is emitted from one of: the first application and the microservices module, or a component associated with the browser container. The modified strand may be received by one of: the second application, the microservices module, or a component associated with the browser container.

Additionally, the rules engine allows for end users to define or customize how the applications interact. For example, the action command may be a default action defined by the rule accessed through the rules engine. Or, the action command may be a user-defined action command.

The method and system can further integrate the action command beyond just a defined receptor. For example, in one embodiment the method and system may include mapping the action command to a document object model associated with the second application. In another example, where the second application is a financial services application, the method and system can bridge the action command to a financial services workflow solution governing the second application. Moreover, the financial services workflow solution may be the financial desktop connectivity and collaboration consortium workflow solution.

In another embodiment, the interoperability of applications is facilitated by a distributed data store made available via the microservices module. Where prior data store techniques worked on an operating system level, secure sandbox restrictions previously prohibited this technique for independent browser applications without the user of a server. Whereas, by inclusion of the microservices layer between applications running on the browser container(s), the applications can effectively share the distributed data store.

A better understanding of the disclosed technology will be obtained from the following detailed description of the preferred embodiments taken in conjunction with the drawings and the attached claims.

DETAILED DESCRIPTION

Embodiments of the disclosed technology providing for a method and system integrating multiple applications across a processing platform. Operating within a browser platform allows for integration of multiple mark-up language applications.

Figure 1:
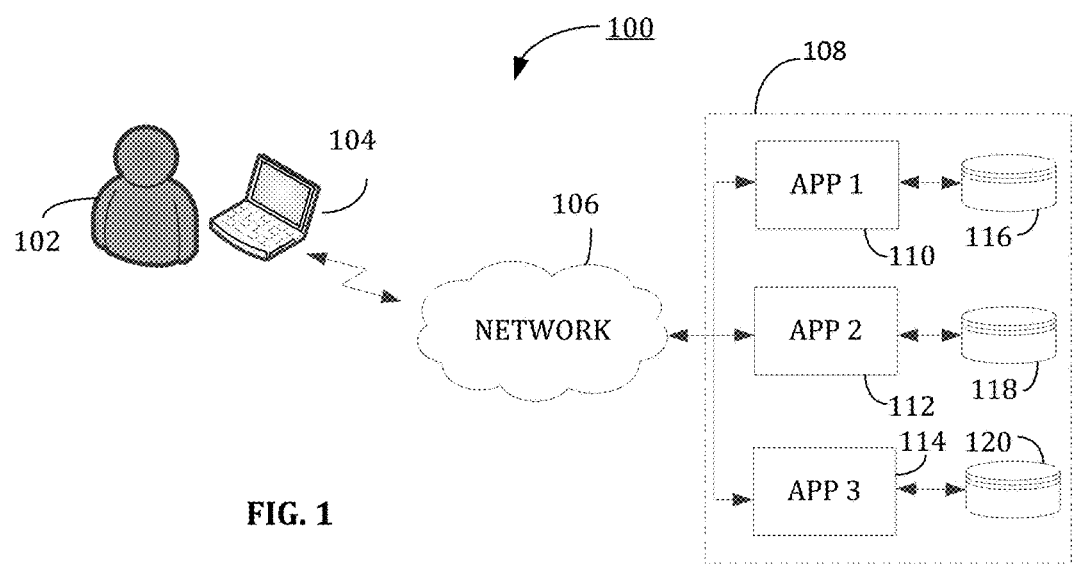
FIG. 1 illustrates a block diagram a computing environment providing for user accessing multiple integrated applications within a common processing platform.

FIG. 1 illustrates one embodiment of a processing system 100 with a user 102 accessing a computing device 104 engaging a network 106. The system include server 108 having a plurality of applications 110, 112, and 114 stored thereon. The applications are HTML solutions, including mark-up language files and executable instructions from a storage device 116, 118, and 120 respectively.

The user 102 may be any suitable user accessing a computing device 104. The device 104 may be any suitable processing device operative to execute the applications thereon. For example, the device 104 may be a mobile computer, a laptop, a desktop computer, a tablet computer, a smart phone, or any other device providing for network connection and executing a browser application within a browser container.

The network 106 may be any type of network operative to interconnect the computing device 104 to the server, such as but not limited to the Internet, a virtual private network, an intranet, etc. It is recognized that omitted from FIG. 1, for clarity purposes only, the computer 106 and the server 108 may include additional hardware and/or software enabling connectivity and communication in accordance known network protocols.

The server 108 may be any suitable type of network-accessible server engaged by the computing device 104 using a browser application running thereon. Each application 110, 112, and 114 is illustrated as being disposed on the server 108. The applications 110-114 are executable instructions executed by the browser application on the computing device 104 or executed by the server 108. The applications 110-114 are illustrated with storage devices 116-120 having the executable stored therein. It is recognized that additional libraries and related data may be stored in the storage device 116-120 allowing for execution as described herein. For example, if the application 110 is written in an executable JavaScript code, the storage device 116 may include library information usable with the executable.

It is recognized that in one embodiment, the server 108 may be disposed within the processing device 104, accessible as an internal application. For example, if the user 102 engages the browser on the processing device 104 to retrieve a local mark-up language file, the computing device therein acts as the server 108, such that the present method and system is not expressly limited to or requires network connectivity.

The method and system integrates multiple applications, which can be locally stored and/or network-stored. For example, one embodiment may include a combination of local and network storage, where applications are network-stored, downloaded by the browser and then locally-executed. Whereas, another embodiment may include network-based execution of the applications with the browser enabling the interfacing functionality via the local processing device.

It is further recognized that the server 108 may be any number of servers 108 and is not expressly limited to a single server 108. Rather, it is recognized that via the network 106, the applications 110-114 may be across a distributed processing environment.

Figure 2:
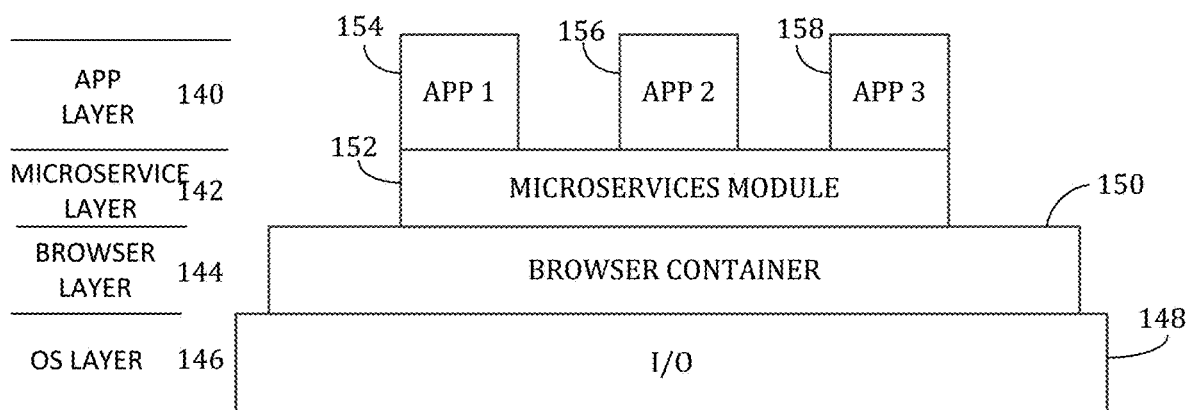
FIG. 2 illustrates a block diagram of a processing architecture allowing for integration of multiple applications across a common processing platform.

FIG. 1 illustrates a general processing environment in which the method and system for integrating multiple applications operates. FIG. 2 illustrates an operational layer diagram. The layers including an application layer 140, a microservices layer 142, a browser layer 144, and a native operating system layer 146.

The operating system level 146 includes input/output interface executable 148. By way of example, the native operating system may be a Linux® operating platform, Apple® OS, Microsoft Windows®. The i/o interface 148 enables typical user interaction in accordance with known techniques.

The browser container 150 executes on the operating system layer 146. The browser container includes at least a portion of browser executable, such as for example Google Chrome®, Mozilla Firefox®, Apple Safari®, Microsoft Internet Explorer®, etc. As used herein, at least a portion of the browser executable is any application or applications executed on the native operating system platform 146 that reads hypertext mark-up language files and enables related executables. The container further includes operating system hooks.

On top of the browser layer 144 is the microservices layer 142. Within the microservices layer 142 is the microservices module 152. In one embodiment, the microservices module 152 executes in a computer language compatible or executable with the browser container 150. For example, in one embodiment the microservices module 152 is written in a JavaScript language. The microservices module 152 executes on top of the browser layer 144 and includes exchange scripts for transmission to executables on the application layer 140.

The microservices module 152 includes a plurality of processing modules facilitating communication between applications (e.g. applications 154, 156, and 158). The microservices module 152 is not exclusively connectivity, but also an electronic brain between the applications. Via numerous microservices modules, including but not limited to embodiments expressly disclosed herein, microservices modules use interoperability functions to transform communications between applications, including for example conditional transformations based on system-defined or user-defined definitions, where conditional transformations allows a single action in a first application to means different results or operations in other applications. Intelligence within the microservices modules orchestrated interoperability between applications.

Applications 154, 156, and 158 execute on the application layer 140. In one embodiment, these applications receive exchange scripts from the microservices module 142. In another embodiment, these exchange scripts are preloaded. As described in further detail below, the inclusion of the exchange scripts facilitates communications between applications 154-158 across the microservices layer 142. This cross-application communication occurs above the operating system layer 146.

As used herein, the browser container 150 operating on the browser layer 144 refers to back-end processing. From a front-end perspective, the viewable output to users provides for individual browser windows. Each browser window is a separate application, such as applications 154-158. In back-end processing, this does not translate to separate browser containers 150. Therefore, as used herein a browser window in the front end illustrates a separate application, a stand-alone instantiation of an application running on the browser layer 144.

The processing system used herein operates within the browser container, which provides functionality to the desktop while at the same time insulating that functionality from any operating system specifics. The applications are independent of the operating system and can transparently run on the browser containers across any number of operating systems.

Figure 3:
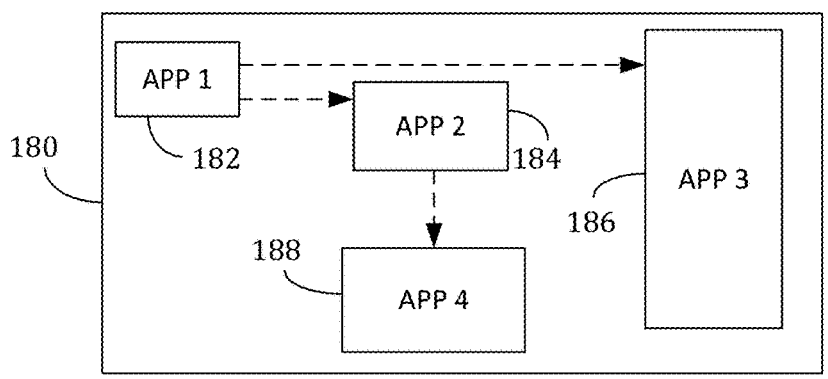
FIG. 3 illustrates a graphical representation of a display window with multiple mark-up language applications.

FIG. 3 illustrates a sample screenshot of an operating system window 180 having multiple applications 182, 184, 186 and 188. Each application 182-188 is executing as a stand-alone executable within a browser window such as each application 182-188 is a separate browser window having a separate application executing therein. In other words, each window is running its own security sandbox, the application operating within the browser container. The applications 182-188 are written in hypertext mark-up language, such as HTML 5 with corresponding executable(s). Not visible in the screenshot 180 is the microservices module operating between the application level and the browser level, as illustrated in FIG. 2.

In the screenshot 180, the user engages the first application 182 for performing an operation or otherwise interacting. By way of example, the first application 182 may be a stockwatcher application that allows for entering a stock symbol and seeing one or more stock charts. Dashed arrows in the screenshot represent non-visible interaction between applications enabled by the microservices module 152 of FIG. 2.

In the example of the stock watcher application 182, the user may enter a stock symbol into a search bar, retrieving the current daily stock price chart. Staying within the microservices layer (144 of FIG. 2), the first application 182 can then directly interact with the second application 184 and third application 186 via the interoperability functions within the microservices module In the example of a stock chart, the second application 184 may be an application for buying/selling shares. Thus, upon receiving search results in the first application 182, the second application 184 is automatically updated to allow for buy/sell transactions for that particular stock.

Continuing with this example, application three 186 may be a newsfeed. Thus, upon search results in the first application 182, the third application 186 updates a news feed with current news articles relating to the selected company.

Multiple degrees of interactivity are within the present invention. Thus, in addition to applications two and three (184, 186) being in communication with application one 182, the fourth application 188 can be in communication with the second application 184. Using the above example of the first application 182 being a stock price engine and the second application 184 being a buy/sell application, the fourth application 188 can be an accounting application showing the available funds for the user for any buying transaction or share listings for any selling transactions.

Therefore, by inclusion of a microservices module with exchange scripts into the applications 182-188, and the applications being in hypertext mark-up language operating on the browser layer, the present method and system enables interoperability between these multiple applications. The integration of stand-alone applications in independent executable browser windows opens for cross-application data sharing not previously available because of the secure sandbox concerns associated with browser executables.

Figure 4:
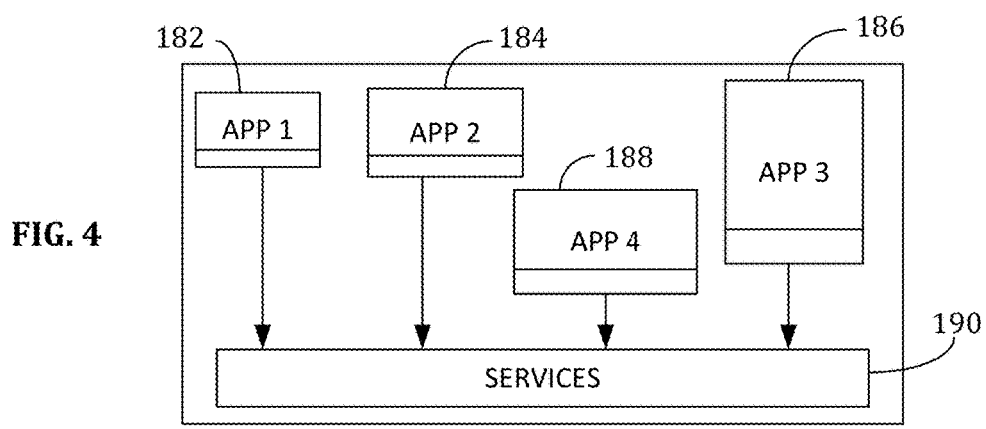
FIG. 4 illustrates a back-end representation of the display window of FIG. 3.

While FIG. 3 is the front-end display, FIG. 4 illustrates the back-end processing. FIG. 4 includes the executable applications 182, 184, 186 and 188. These applications 182-188 are in communication with a microservices module 190. The applications 182-188 include the exchange scripts and are in communication with each other through the microservices module 190.

In one embodiment, the applications 182-188 and the microservices module 190 can collectively form a single general application. For example, using the example of FIG. 3, a single financial services application can include all four individual applications 182-188 with interactivity from the microservices module 190. Where the present exemplary embodiment relates to a financial services application, this embodiment is not limiting in nature. Rather, the applications can relate to any service and is not restricted to the financial services arena.

Where each application 182, 184, 186 and/or 188 can be stand-alone executable applications, the microservices module 190 allows for collective integration. For example, the applications may be all written by different companies. The inclusion of the microservices module enables otherwise independent applications to become interoperable above the operating system platform, significantly improving productivity. Moreover, the microservices module allows for easy access and integration of proprietary and/or legacy applications with additional third-party software.

Figure 5:
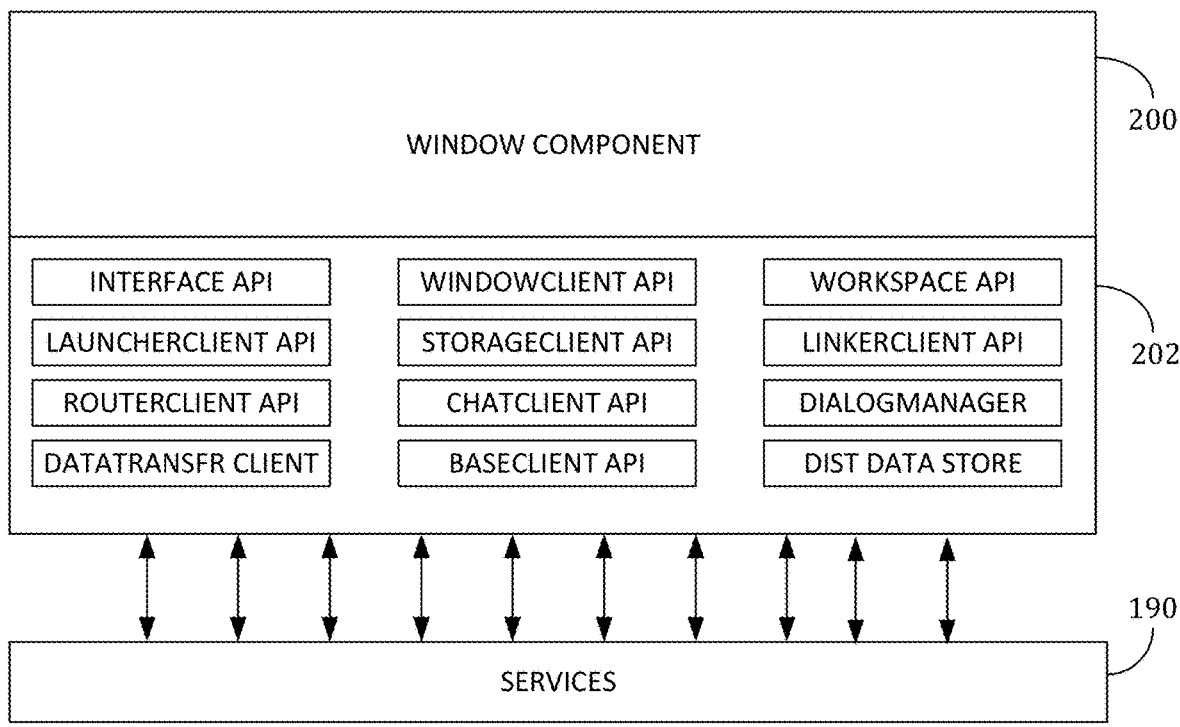
FIG. 5 illustrates an architectural overview of the application layer.

FIG. 5 illustrates a graphical representation of a window component 200, a browser executable executing an application therein. The browser executable is within the browser container such as 150 above, the container further including operating system hooks. In this embodiment, the microservices module is an independently-threaded JavaScript module providing centralized functionality through multiple applications (such as apps 182-188 of FIG. 3). The window 200 uses APIs to interact with the microservices module 190.

FIG. 5 illustrates a sample collection of application program interfaces (APIs) 202, where it is recognized by one skilled in the art than any number of APIs may be used for enabling interactivity. In one embodiment, each window, such as window 200, is a Chromium® container sitting on top of a secure operating layer. The window's JavaScript accesses the underlying operating library. The operating library (FSBL.js) is a set of client APIs connecting to the microservices. In one embodiment, the exchange scripts are preloaded scripts including FSBL.js and the APIs 202.

The APIs 202 enable the communication of the window component 200 with the microservices module 190 and subsequent interactivity by using defining interactive characteristics and executable instructions.

In accordance with known program techniques, the APIs 202 are available and loadable as part of a library in conjunction with the HTML text file. The launching of APIs 202 provide for executable functionality allowing for inter-application communication through the microservices module 190.

As recognized by one skilled in the art, numerous APIs provide for varying degrees of functionality and interoperability with other applications running in the browser container. By way of example, a Router API contains programming language sending and receiving events between applications. In the Router API, event router callbacks for incoming messages are in the form callback(error, event). If error is null, then the incoming data is always in event.data. If error is set, it contains a diagnostic object and message. On error, the event parameter is not undefined.

In another example, a Linker API provides a mechanism for synchronizing components on a piece of data. For instance, a user might link multiple components by "stock symbol". Using the Linker API, a developer could enable their component to participate in this synchronization. The developer would use LinkerClient # subscribe to receive synchronization events and they would use LinkerClient # publish to send them.

In another example, in order for components to be linked, they must understand the data format that will be passed between them (the "context"), and agree on a label to identifies that format (the "dataType"). For instance, components might choose to publish and subscribe to a dataType called "symbol". They would then also need to agree that a "symbol" looks like, for instance, {symbol:"IBM"}. The Linker API doesn't proscribe any specific format for context or set of labels (some would call this a "taxonomy"). In the case that components used different taxonomies, prior art platforms would fail to deliver interoperability, but the present invention could intermediate the intended action, utilize a microservice to translate from one taxonomy to another, and then deliver the message to the second application. Thereby, multiple applications, each understanding its own taxonomy, can effectively be integrated.

End users create linkages by assigning components to "channels". One embodiment represents channels by color. When a component is assigned to channel "purple", publish and subscribe messages are only received by other components assigned to that channel. The Linker API exposes functionality to manage channels programmatically, including building a Linker Component using a different paradigm, or apply intelligently link components based on business logic.

Figure 6:
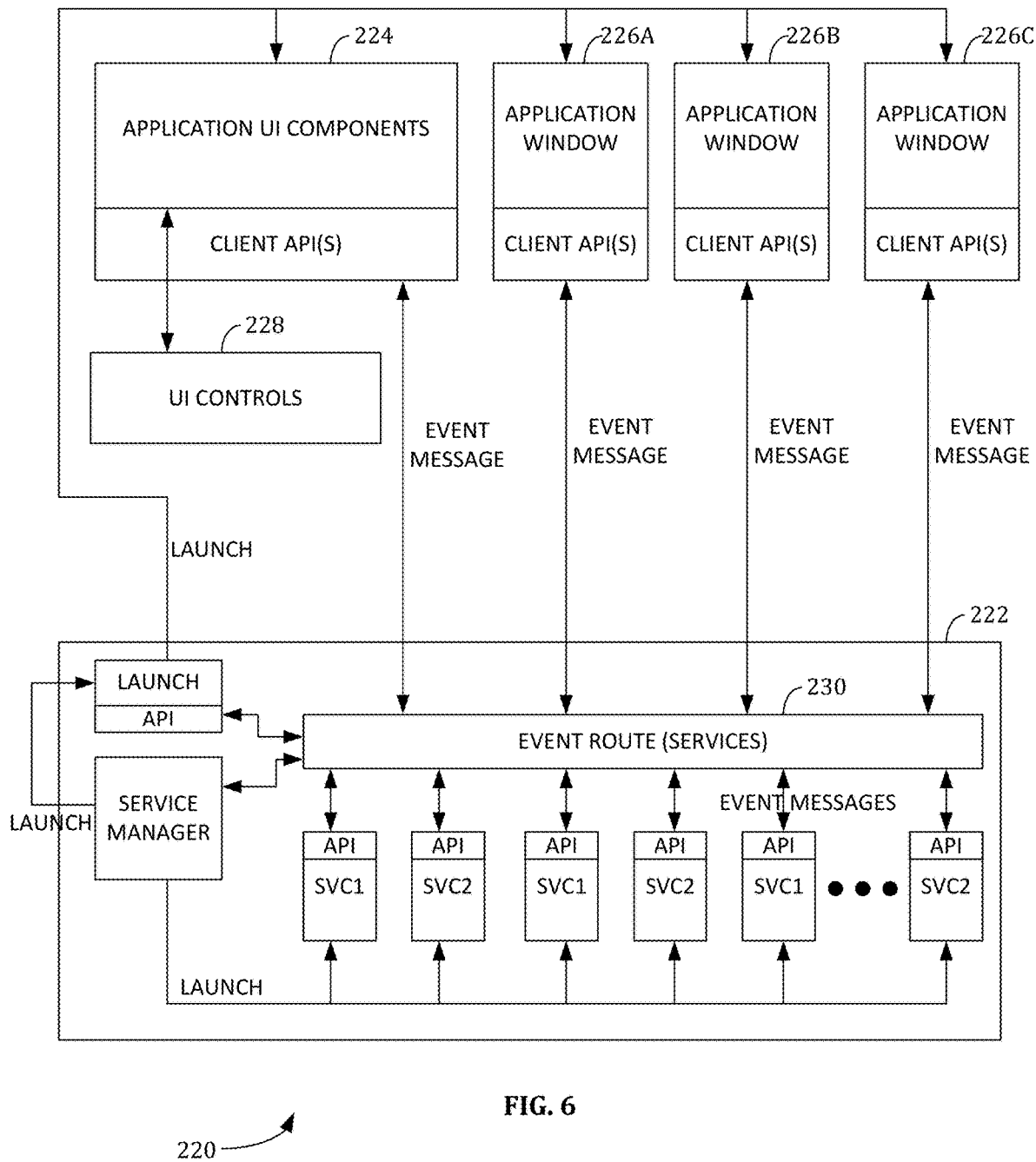
FIG. 6 illustrates a flowchart of the steps of one embodiment of a method for integrating multiple applications across a processing platform.

FIG. 6 illustrates a block diagram of a system view 220 of the computational architecture. The system 220 includes a processing core 222, application user interface components 224 and application windows 226*a*-226*c*. The UI components 224 and application windows 226 include APIs. The system 220 includes processing controls 228.

FIG. 6 is an architectural breakdown of a processing application: a set of cooperating components and microservices. The components access the microservices though the client API contained in the processing library. All communication between windows 226 and the microservices module takes place through an event router 230, which itself is a microservice.

In one embodiment, the processing core 222 is packaged as a NPM module to simplify updates. The most common scenario for processing users (i.e., developers) is to build new components on top of the core module 222. Developers can connect independent components, existing prebuilt components, and third-party components to the processing core to form a single application.

In further embodiments, the processing core further supports adding new microservices and corresponding client APIs as developed and integrated.

The processing Library is a set of client APIs connecting to one or more microservices. For example, a Launcher Client connects to the Launcher microservices. Likewise, a Router Client connects to the Router microservices. The Router microservices (via the Router Client) acts as an inter-window event hub, providing communication between all components and microservices.

As illustrated in FIG. 6, the communication between windows 226 and the microservices are event messages. The event messages indicate an interaction, a processing occurrence, in one application or window. Through microservices, the interaction generates an action command for one or more other applications. These action commands are also illustrated as event messages transferred between windows 226 and UI component 224.

The processing architecture of FIG. 6 illustrates several key aspects of the processing system and method. For example, components are "pluggable" in the sense they can be mixed and matched to form an application. For example, existing processing components can be further customized by developers building their own application. Developers can also create their own components or use third-party components built for the processing platform. As used herein, the term component generally refers to a self-contained unit of functionality built with mark-up language and executables, such as HTML5/JavaScript, that lives in a window. A processing component may be a complete application, but typically an application is made up of multiple cooperating components, for example charts, chat, news, etc. A component may have multiple active instances within the application, each running in its own window. A component is analogous to a web page by its single unit of functionality composed of through HTML, CSS, and JavaScript.

A special class of components, called presentation components, are provided as samples to provide common UI functionality to end users. An example is the toolbar component that end users can use to launch or control other components.

Similar to components, microservices can be pluggable, delivering centralized functionality. In the processing environment, microservices are less likely to change (or be interchanged) than components since they provide a basic building block functionality. Nevertheless, developers can create their own microservices with corresponding client APIs, essentially extending the processing library.

In one embodiment, connector microservices communicate externally to public or private servers (e.g., data feeds, databases, or cloud-based microservices).

In one embodiment, each individual component and microservices are independently threaded in its own Chromium window that sits on top of a secure operating layer.

As used herein, a client API is a JavaScript API that interfaces with one or more microservices using router messages. Some client APIs are defined for specific microservices, like the Launcher Client API is specifically for the Launcher microservices. Other client APIs may provide composite functionality out of one or more existing microservices, like the Dialog Manager Client API which builds on the Launcher Client. Depending on the microservices, some parts of the API functionality may be implemented on the client side with the centralized functionality residing on the microservices side.

As used herein, a processing component is a piece of functionality built with mark-up language and executables, such as HTML5/JavaScript, that lives in a processing window. A processing component is the basic building block of the collective application. A component may have multiple active instances within the collective application, each running in its own window (e.g., multiple chart windows, multiple chat windows).

The processing framework is a cooperating set of software components and microservices used to build HTML5 desktop applications on top of the operating layer. For example, a processing framework may enable one or more collective applications to be integrated as described herein, such as via the microservices and event messages.

A library is a set of client APIs that have been packaged together for easy component access. A router is a microservice that is the center point for all processing framework communication. The router sends and receives messages between windows, enabling communication between all components and microservices through multiple types of messaging: such as Listen/Transmit, Query/Response, and Publish/Subscribe.

A window is a browser container, sitting on top of an operating layer. A microservice is an active, independently-threaded JavaScript module providing centralized functionality throughout a processing application. Microservices provide capabilities to processing components as well as other microservices. Exemplary microservices include the router microservice, launcher microservice, linker microservice, chat microservice, etc. Microservices typically don't have a UI; instead, they can be interacted with using a corresponding client API. Communication to and from microservices is through the router (itself a microservice).

Figure 7:
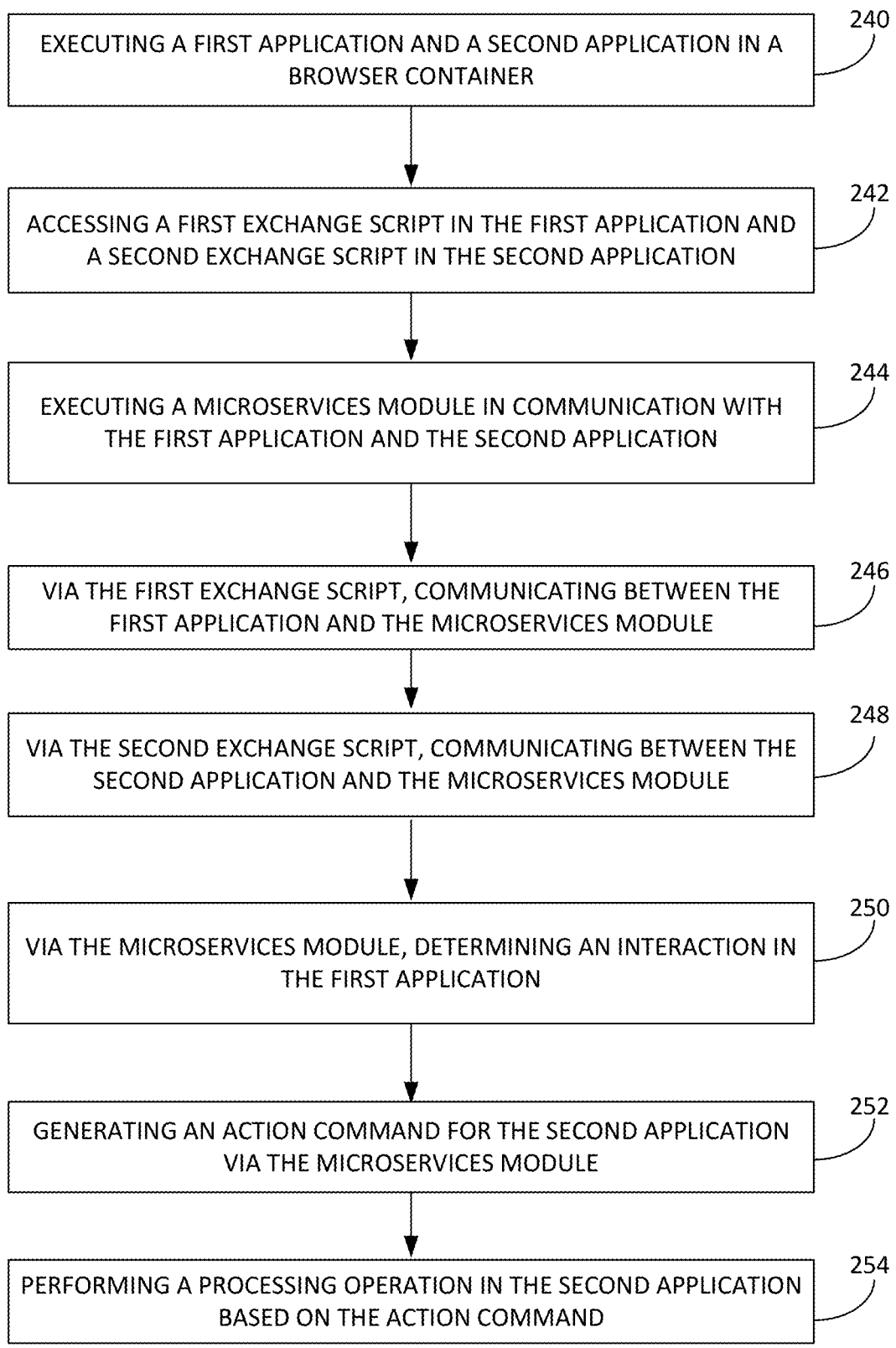
FIG. 7 illustrates a flowchart of the steps of one embodiment of user interfacing with integrated applications.

Within the above architecture, FIG. 7 illustrates a flowchart of the steps of one embodiment of a method for integrating multiple applications. A first step, step 240, is executing a first application in a browser container and a second application in the browser container. The applications are independent of each other. As described above, the first application is a mark-up language text file and associated executable instructions such as for example JavaScript code. The second application is also a mark-up language text file and associated executable instructions. The first application and second application are independently executed within separate instantiations of a browser application running within the browser container.

While not expressly noted in FIG. 7, the execution of the first application and the second application may be preceded by accessing a storage location having the HTML solution(s) stored therein. For example, one embodiment may include accessing a network location via a uniform resource locator to retrieve the HTML file. In another example, one embodiment may include accessing a local storage location for retrieval.

Step 242 is accessing a first exchange script in the first application and a second exchange script in the second application. The exchange scripts, in one embodiment, are executable instructions executed by the browser application, for example a JavaScript code inserted into or compatible with existing JavaScript libraries. The exchange scripts provide functionality for detection or recognition of a particular activity within the application, as well as communication of this detection.

Step 244 is executing a microservices module, which is in communication with the first application and the second application. By way of example, FIG. 5 illustrates a microservices module 190 being disposed between the browser layer 144 and the application layer 140. In FIG. 5, the microservices module 190 is also in communication via the APIs 202.

Step 246 is, via the first exchange script, communicating between the first application and the microservices module. Step 248 is, via the second exchange script, communicating between the second application and the microservices module. Therefore, via steps 246, 248, the microservices module acts as a central location for communications with applications.

Step 250 is determining an interaction in the first application via the microservices module. By way of example, an interaction in the first application may be a user entering a text, selecting an icon, selecting a hyperlink, etc.

Step 252 is generating an action command for the second application via the microservices module. For example, if the first application is a stock chart application, a user may enter a ticker symbol in a search bar to retrieve the stock chart. Where the first application generates the stock chart, the microservice module determines the interaction of the stock selection. The action command may be based on the application and the type of generated actions. In the example of a stock selection, the action command may be a notification of a stock ticker symbol. Moreover, the action command may trigger general functionality located in the application's preloaded scripts, i.e. the microservices layer 142 if FIG. 2, such as by way of example changing an icon on the window's header, or the functionality may be custom functionality located in the 154, 156 and 158 application layer but triggered by the microservices layer 142 (FIG. 2), such as displaying new application data corresponding to the action command.

Step 254 is performing a processing operation in the second application based on the action command. This step may be performed by the second exchange script. In the example of a stock ticker and the second application is a news feed, action command may include translating the stock ticker to the company name and retrieving recent news stories about the company. The processing operation in the second application may then include displaying recent new articles or headlines relating to the company associated with the stock ticker.

It is further noted, the performing of the processing operation by the second application does not require a visual front-end display. For example, the processing operation can be to simply track or log the information from the action command, but a change in output display is not expressly required.

The steps of FIG. 7 therefore provide for interoperability of applications executing within browsers containers on a common operating system platform. The containers are unique browser applications running HTML solutions, including HTML5 encoded text and executable applications. The inclusion of the microservices layer and APIs provide for interactivity between these applications within the shared operating system platform.

In one embodiment, the integration between applications may additionally include data fields as part of the interaction in the first application. Where the above example is a stock ticker symbol, data fields may include additional information directly usable by the second application beyond a general notification of action within the first application. For example, a first application may be a financial accounting application that includes a secure login. Login credentials for the first application may be usable for the second application, which can include processing a first data field within the interaction in the first application to generate a second data field for the action command. For example, if the data field is a secure login, the data field may be processed for being usable to generate additional an additional login or identity verification for the second application.

It is further noted, the present embodiments above describe multiple applications, where the number of applications is not expressly limited. For example, a user may have any number of applications in co-execution by the browser container with interoperability across the microservices module.

The present method and system improves interoperability using features available in HTML5. The present description is not expressly restricted to HTML5 but is applicable to all future mark-up language programming language standards having corresponding functionality as found within HTML5.

Moreover, one embodiment provides for applications in the financial services industry, such as the Finsemble™ software. HTML5 is rapidly being adopted by the financial industry because it is both light-weight and is the only cross-platform language supported by all major technology vendors including Google®, Microsoft® and Apple®. However, modern web browsers which are typically used to run HTML5, do not provide the capabilities needed by real-time trading applications. In one embodiment, based on Google Chromium®, containers provide a controlled, high-performance HTML5 engine purpose-built for desktops at banks and buy-side firms.

Within the processing system described herein, the method and system allows for further functionality through integrating non-browser applications with applications executing on a browser container. Non-browser applications are applications that do not within a browser container, and in some embodiments can run on an operating system level. By way of example, a non-browser application may be any suitable application running on a Windows, MacOS, or Linux platform, but are not HTML encoded running within a browser.

Figure 8:
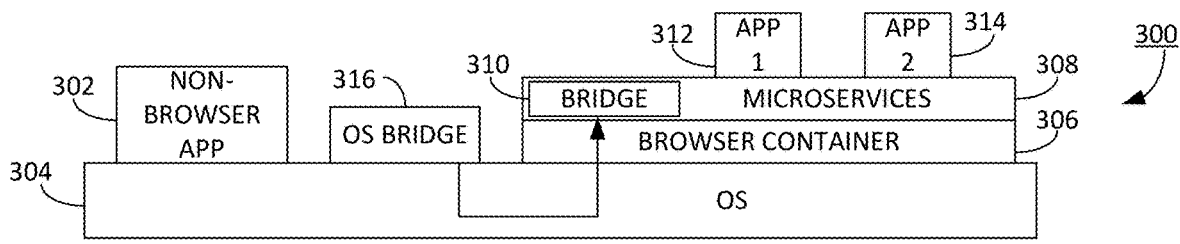
FIG. 8 illustrates an architectural view of assimilation of non-browser application into a browser container.

Therefore, to include the non-browser application functionality, FIG. 8 illustrates a system 300 for integrating a non-browser application 302. In the system, the non-browser application 302 runs on a first operating system 304. The first operating system 304 may be any suitable operating system, such as but not limited to a Windows® operating system, a MacOS, Linux, etc.

The system 300 includes a browser container 306 running on the operating system 304. The browser container 306 includes at least a portion of a browser executable and OS hooks. The browser container 306 includes a microservices layer 308 having a microservices bridge module 310 therein. A first application 312 and a second application 314 run on the browser container 306. The first application 312 and second application 314 may be any suitable applications similar to the elements described in FIG. 1-7 above. Additionally, the system 300 includes an operating system bridge module 316, where the microservices bridge module 310 and the operating system bridge 316 are collectively referred to as the bridge.

It is further noted, the OS 304 may be the same OS for both the non-browser application 302 and the browser container 306. Or, in another embodiment the OS 304 may be different between the non-browser application 302 and the browser container 306. For example, the non-browser application 302 may be disposed in a networked environment, running on a server with the browser container 306 being locally executed. In another embodiment, non-browser application 302 and browser 306 could all be executed locally.

Processing steps for assimilating the non-browser application 302 with the browser container 306 are described with respect to FIG. 10 below. Once assimilated, the non-browser application 302 behaves like any other browser container application, e.g. application 312, 314. The behavior herein includes user interface operations, including movement, grouping, tabbing, docking, etc. of any number of windows, such that the non-browser application executes its original software code, but is assimilated with the browser window. Using the microservices bridge module 310, in addition to OS bridge 316, creates a seamless user experience between the first application 312 and the non-browser application 302. Moreover, no recoding of the non-browser application is required with the microservices module providing assimilation via the bridge module.

The microservices bridge module 310 operates on the microservices module 308 by including one or more application program interfaces (APIs). The APIs provide translation between the operating system 304 for the non-browser application 302 and the browser 306 and to the microservices 308 built thereon. Moreover, the microservices bridge module 310 communicates with the operating system bridge 316 running on the operating system using known communication protocols common to both the operating system and the browser container, such as sockets by way of example.

Application 312 is HTML encoded, such as HTML5. Inclusion of appropriate scripts, including JavaScript calls, enables the microservices bridge module 310 for referencing APIs. Through these APIs, data calls are translated, allowing for execution of the non-browser application 302 within its appropriate OS 304, but output generation translatable to applications 312, 314 operating within the browser container 306.

The bridge module 310 provides for a shell module or other wrap around a display window of the non-browser application 302. Through inclusion of the shell module or wrap, the non-browser application 302 can share additional display functionalities, including grouping of windows.

Figure 9:
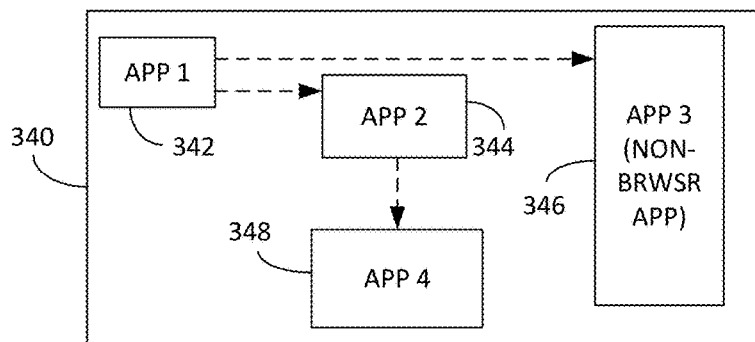
FIG. 9 illustrates an illustrative screenshot of the assimilation of the non-browser application interacting with mark-up language applications.

FIG. 9 illustrates a sample screenshot 340 representation showing four applications 342, 344, 346, and 348. In this example, third application 346 is a non-browser application and applications 342, 344, and 348 are HTML-encoded browser applications. The FIG. 9 illustration is similar to FIG. 3 because from a user viewpoint, these are similar if not identical. The integration of the non-browser application 346 into the user-display 340 allows for window 346 to operate with the system functionalities of applications 342, 344, and 348.

Figure 10:
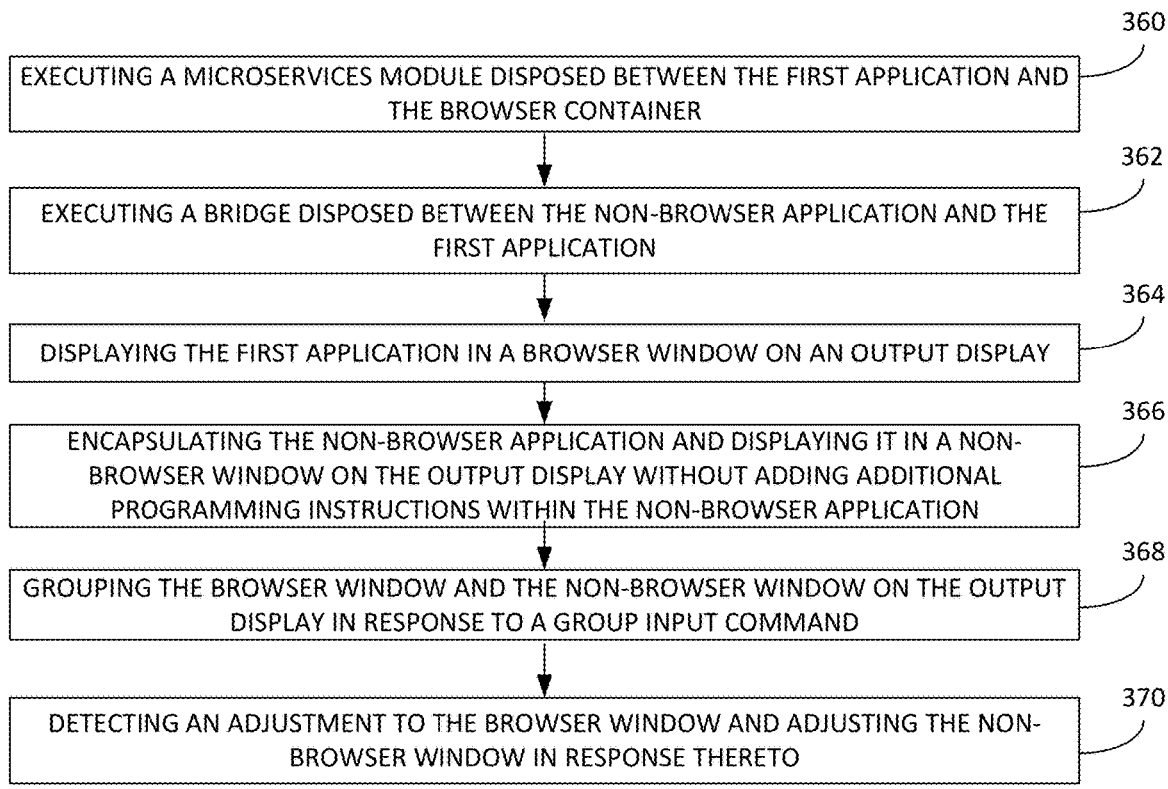
FIG. 10 illustrates a flowchart of the steps of one embodiment of a method for assimilating non-browser applications.

FIG. 10 illustrates a flowchart of the steps of one embodiment of a method for integrating a non-browser application running with a first application executable in a browser container.

The method includes a first step, step 360, of executing a microservices module disposed between the first application and the browser container. Step 362 is executing a bridge disposed between the non-browser application and the first application. By way of example, in FIG. 8, the bridge 310 in combination with the OS bridge 316 is disposed between the non-browser application 302 and the application 312.

Step 364 is displaying the first application in a browser window on an output display. By way of example, FIG. 9, window 342 shows a sample browser window. Step 366 is encapsulating the non-browser application and displaying the non-browser application in a non-browser window on the output display without additional programming instructions within the non-browser application. Again with reference to FIG. 9, window 346 has a non-browser application encapsulated and displayed therein. Also, with reference to FIG. 8, the non-browser application 302 runs, in this embodiment, on the operating system 304 encapsulated and controlled by a microservices running on browser container 306.

Step 368 is grouping the browser window and the non-browser window on the output display in response to a user group input command. A user group input command may be any suitable user input command that indicates the grouping of two or more windows. Various embodiments are discussed in more detail below, including but not limited to moving two windows in positional proximity on screen, a pull-down menu selection, a key command, an icon selection, tabbing operations, etc.

Therein, step 370 is detecting an adjustment to the browser window and then adjusting the non-browser window in response thereto. For example, adjustments of the browser window and the subsequent non-browser window adjustment may be in size, position, content display, etc. It is further noted, the adjustment of browser window and non-browser window are interchangeable as described herein, including adjustments to the non-browser window affecting adjustments to the browser window.

Therein, the non-browser application (302 of FIG. 8) is assimilated with the browser application display(s) without modification of the code of the non-browser application on the operating system. From an operational perspective, in one embodiment, the non-browser application remains unaware that it is assimilated and encapsulated.

As part of the bridge module, the method of FIG. 10 may further include receiving user input via the browser application. User input receipt may be using known input techniques through the OS and browser platform. The user input may also be from one or more other applications running on the browser platform, such as via the microservices module 308. The method includes translating the user input using the bridge module and processing the user input in the non-browser application.

It is further noted, the operating system bridge 316 does not need to be aware of specifics of a particular non-browser application, such as the APIs/protocols it communicates through) when communicating with the microservices bridge module 310. A further embodiment provides that the non-browser application does not require direct communication to any specific application running in a browser container. Rather, assimilation may be integration of the non-browser application without modification of non-browser application code into the browser container processing environment. This assimilation allows for integration of browser and non-browser applications as described herein, such as for example snapping, docking, and grouping, as well as tabbing, as described in greater detail below.

The bridge may include additional functionality aside from receiving and translating between applications. For example, the bridge may further read a configuration file, e.g. a JSON file, allowing for identification of which non-browser applications are allowed for assimilation. For example, a configuration file may include a list of prohibited or authorized non-browser applications. Therefore, the bridge may either enable authorized applications and/or prohibit assimilation of unauthorized applications. In another example, the bridge may need to throttle data coming from the non-browser application into the browser container. For example, native mouse movements may be generated at a rate of 1 mouse-movement event per millisecond, but there is no need to pass into the browser container mouse movements finer grain than 20 milliseconds.

In addition to integration of non-browser applications, the present method and system further provides improved cross-application functionality. When integrating browser containers, including HTML-encoded applications and non-browser applications, varying hotkey commands do not automatically translate. A hotkey command is a predefined combination of keystrokes that generate a defined operation or result. For example, a combination hotkey would be CMD-S as a dual-button keystroke that initiates an automated save function.

Various applications have their own keystrokes. Similarly, when multiple applications are bundled for cross-communication using the microservices layer, these keystrokes may not be available or may complicate processing. For example, different applications may have different functions associated with a hotkey input command. As these applications are not interconnected and communicate, the present method and system enables hotkey functions across multiple applications.

Figure 11:
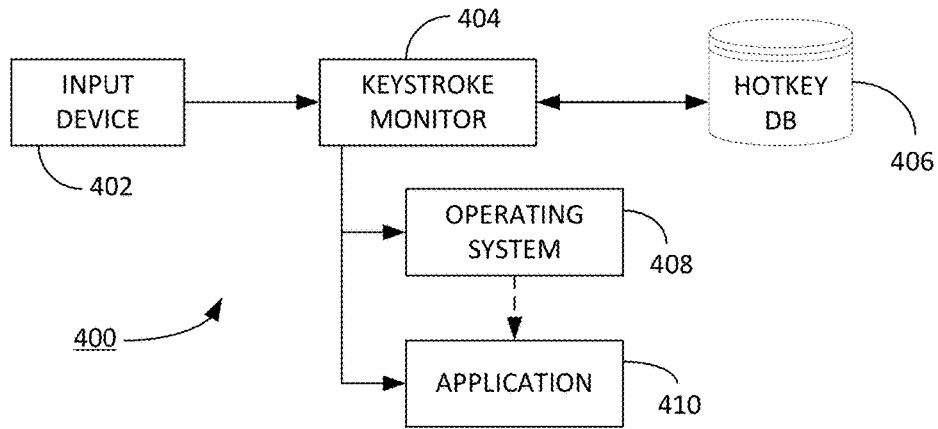
FIG. 11 illustrates a diagram of one embodiment of a hotkey detection device.

FIG. 11 illustrates one embodiment of a hotkey detection system 400. In one embodiment, this system 400 operates within the operating system level, such as OS 304 of FIG. 8. The system 400 includes an input device 402, a keystroke monitor 404, and a hotkey database 406. The keystroke monitor 404 is in communication with the operating system 408 as well as one or more applications, shown generally as 410. While illustrated in an exploded box-diagram format, the keystroke monitor 404 may be disposed within an operating system bridge, such as bridge 316 of FIG. 8, operating on the operating system 408.

Figure 12:
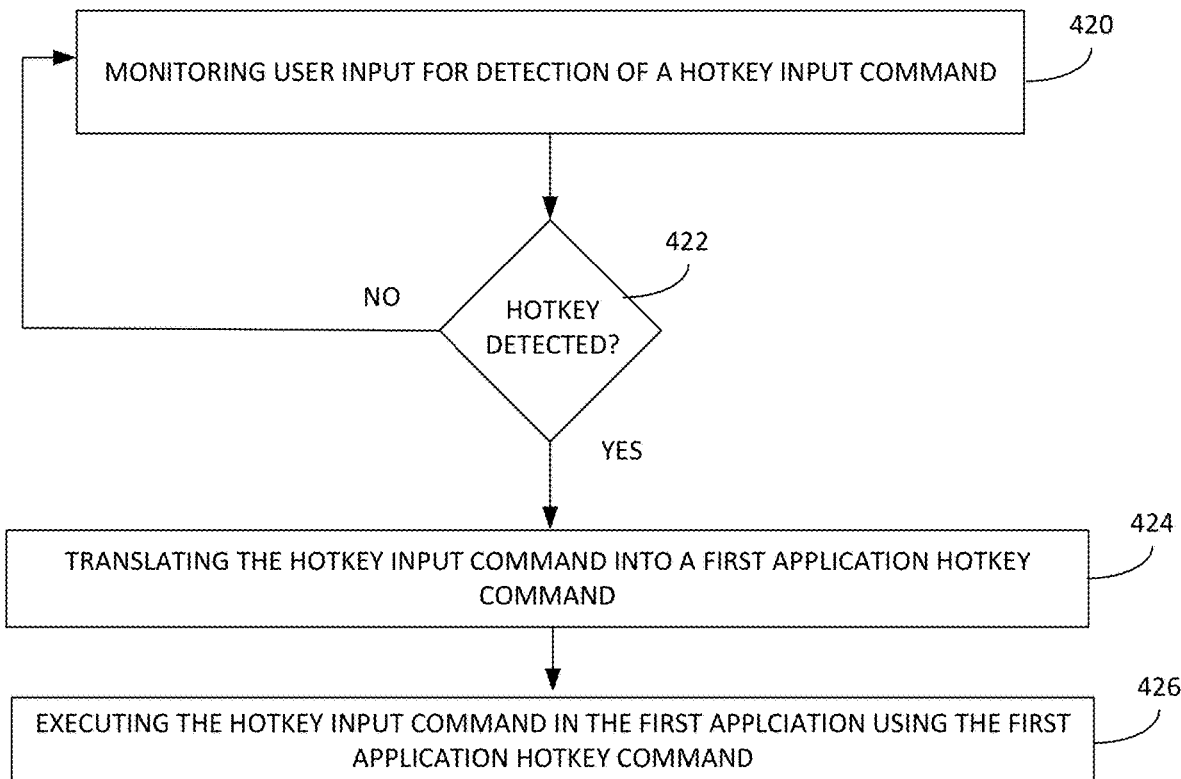
FIG. 12 illustrates a flowchart of the steps of one embodiment of a method for hotkey detection.

Operations of the system 400 are described with respect to the flowchart of FIG. 12. A first step, step 420, is monitoring the user input for detection of a hotkey input command. The hotkey command may be any combination of keystrokes. In one embodiment, the monitor 404 may actively monitor all input commands, such as the input device 402 being a keyboard.

Step 422 is a determination if a hotkey is detected. If no, the method reverts to step 420 to continue monitoring. If yes, step 424 is translating the hotkey input command into a first application hotkey command. In one embodiment, the translating may include accessing the hotkey translation database 406.

In one embodiment, the hotkey translation database 406 may include general hotkey commands recognized for the application 410 or the operation system 408. For example, a user may set predefined keystrokes for the application 410, such predefined keystrokes stored in the hotkey translation database 406. Similarly, where there are conflicting commands generated by a hotkey input command, the monitor 404 may further detect which application 410 is being used by the user for generating a proper command.

Hotkeys may also be local hotkeys or global hotkeys. For example, a local hotkey may be local to an application in focus. As used herein, an application in focus refers to one or more applications being actively used by the user, such as for example an application into which a user is actively typing. A global hotkey may be a hotkey and subsequent input command usable across all applications.

Step 426 is executing the hotkey input command in the first application using the first application hotkey command. Based on the microservices layer, step 426 may additionally include executing the hotkey command in connected or integrated applications.

Where the present method and system allows for integrating multiple applications, these integrated applications may not originally share the same hotkey input commands. The keystroke monitor 404 in combination with the hotkey translation database 406 allows for inter-application interoperability without hotkey mistranslation.

Mark-up language applications running within the browser containers can register for hotkey events. Registration can include a priority setting so the browser container having the microservices module can route hotkey events between application in a configured order. Each application receiving the hotkey can decide to act on it and then consume it, e.g. not to pass it on, act on it then pass it on, only consumer, or only pass it on.

Hotkey recognition and distribution is another example of functionality available to non-browser applications without modification of the non-browser application code. Using the bridge as described above, hotkey keystrokes can be translated and inserted directly into the non-browser application. Another example of non-browser application assimilation without modification of the non-browser application code is generating groupings or interconnections between non-browser applications and applications via the user interface and/or processing, as described below.

In addition to interoperability of multiple browser applications, the present method and system literally interconnects these multiple windows. In the output display, each window is an independent instantiation of a browser container having an executable application therein. The present method and system allows for a unified multi-window application through the snapping, docking, and grouping (SDG) of windows, also collectively referred to as grouping. Where SDG presents a visual front-end display of two or more windows, processing enables further functional interoperability as described herein. For example, when two windows are connected on the screen, they are also functionally grouped via the microservices module. It is noted, the SDG is equally applicable to one or more non-browser applications assimilated into browser window(s).

The microservices module facilitates interoperability, but the visual display includes any number of common display attributes. For example, when windows are integrated as described below, the integration includes window display attributes, as recognized by one skilled in the art. Window display attributes can include common color coding, common toolbars, common header controls, etc. Thus, windows subject to SDG can present a common visual interface to the user, as well as functional interoperability as described herein.

The method for integrating applications executable within the browser container including displaying the applications in separate windows. As noted above, each window is a separate application running in the browser container.

For a visual representation of SDG, FIGS. 13-17 illustrate multiple screenshots of three separate browser containers having different applications. In this exemplary embodiment, the first application is a news application 450, the second application is a stock chart application 452, and the third application is an account services application 454. For example, the first application 450 may include a news feed of financial headlines received from one or more content sources. The stock chart application 452 may provide stock chart(s) for selected tradable instruments. The account services application 454 may include account information for one or more users, including financial resources available for trading activities.

Figure 13:
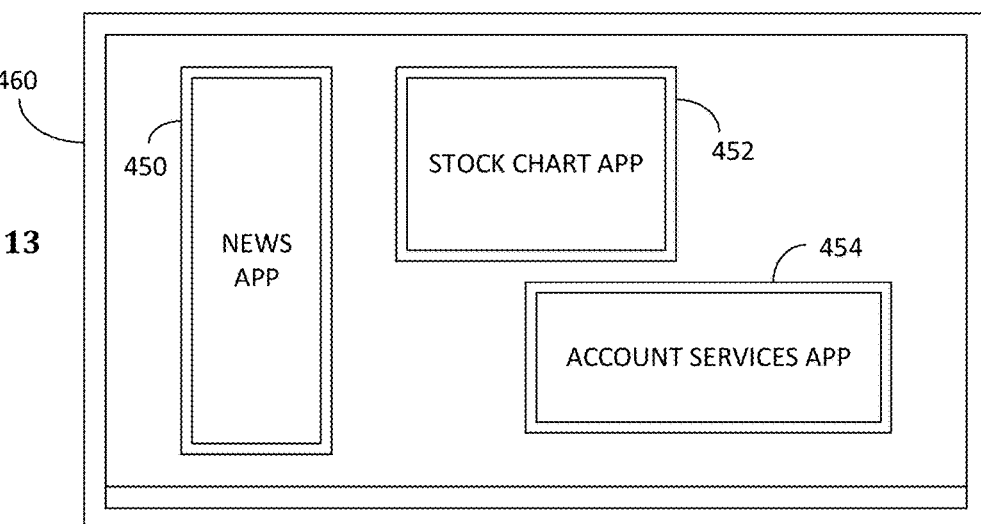
FIGS. 13-17B illustrate exemplary screenshots illustrating docking, tabbing, and multi-window integration.

While FIG. 13 illustrates the front-end display, the applications include exchange scripts as described above. The applications are additionally in communication with the microservices module via the exchange scripts as described above.

In FIG. 13, the screenshot 460 shows these three separate application windows apart from each other. Using an input component, such as a mouse for example, a user may grab and slide the second application 452 and the third application 454 across the screen towards the news application 450. Therefore, a processing operation provides for monitoring an onscreen position of the first window and an onscreen position of the second window.

Figure 14:
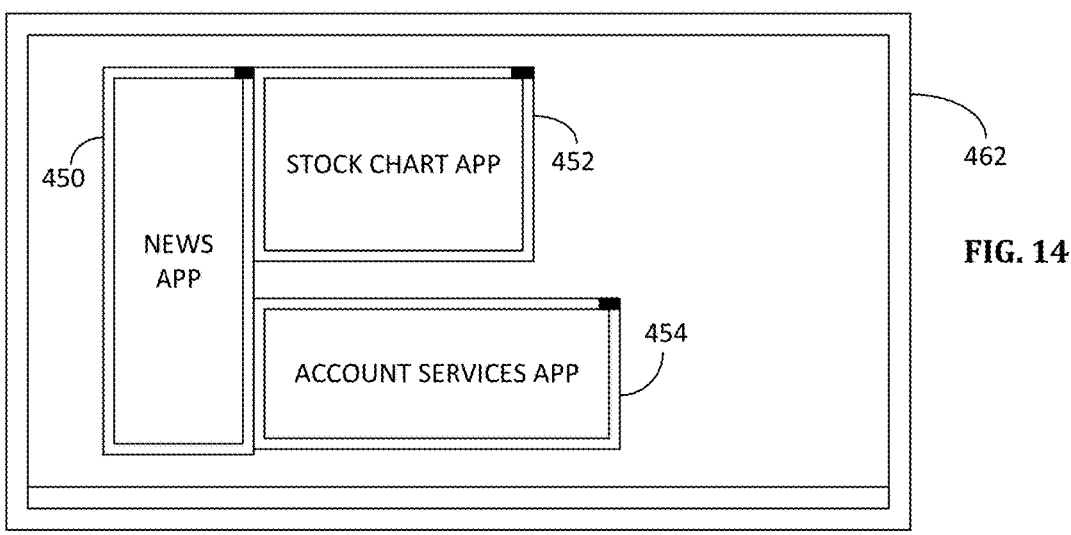

As illustrated in FIG. 14, when two applications are in close proximity, they can be grouped together. Screenshot 462 illustrates the docking of news application 450 with stock chart application 452, as well as news application 450 with account services application 454.

Based on tracking the position of the application window, a tracking module running on the operating system level detects when one browser window gets in close proximity to another window. Upon reaching a defined positional proximity, for example within a proximity of one-eighth of an inch or within a distance of 15 pixels, the tracking module can then initiate a grouping operation. The grouping operation highlights or otherwise visually modifies a portion of the application windows and then graphically engages the two window frames together, as illustrated in FIG. 14.

In one embodiment, when docked together the application display can be modified to include an undock tab 464. The undock tab 464, in response to a user selection, engages an undock module that graphically separates the applications, such as reverting back to spacing illustrated in FIG. 13.

When the windows 450, 452, and 454 are grouped in the display, they are also grouped via processing operations. As described above, the present method and system includes interoperability between unique browser applications across the microservices module. The snapping, grouping, and docking of two or more windows creates the application-to-application association for the service layer to directly communicate between applications.

Using the example of the screenshots of FIG. 14, when an article about Company X appears in the news application 450, Company X's stock chart is automatically displayed in the stock chart application 452. Similarly, the account services application 454 is updated to show ownership interests in the company, as well as buy/sell options. This interoperability occurs via the service layer on the processing of executable operations with the visual interoperation on the front-end. In one example of interoperability, a designated hotkey command may generate an action in all three applications 450, 452, 454 because they are grouped. By contrast, if ungrouped and application 450 was in focus, the hotkey command may be limited just to application 450.

Figure 15:
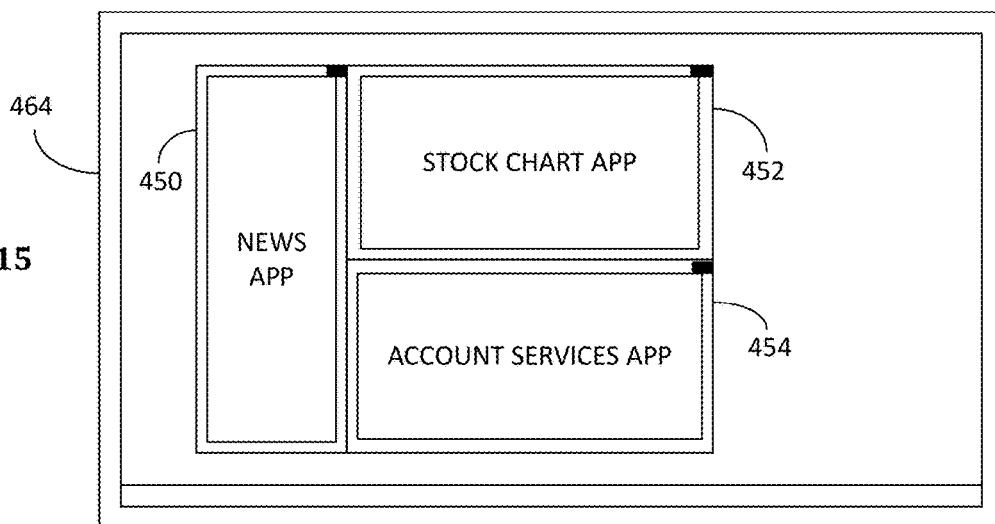

The present method and system provides for further modifications of groupings of windows. For example, FIG. 15 illustrates screenshot 466 with applications 450, 452, and 454 adjusted into a rectangle shape, including elongating the stock chart application 452 and stretching the account services application 454 upwards. In one embodiment, a user may manually change the window sizes. In another embodiment, a sizing module may automatically adjust snapped windows to form a more blocked or window-shaped structure.

Here, in FIG. 15, the windows are grouping into a single window 470. Thus, in this display the applications 450, 452, and 454 operate similar to prior browser environments using frames, but each application is separate instantiation.

The present method and system allows users to rapidly create groups of windows that join and move together. Users can swiftly spawn necessary components and bring them together into unified configurations that can be relocated to different locations on the screen, even moved across different monitors. Groupings can also be readily resized as well as broken up and new groups formed.

Figure 16A:
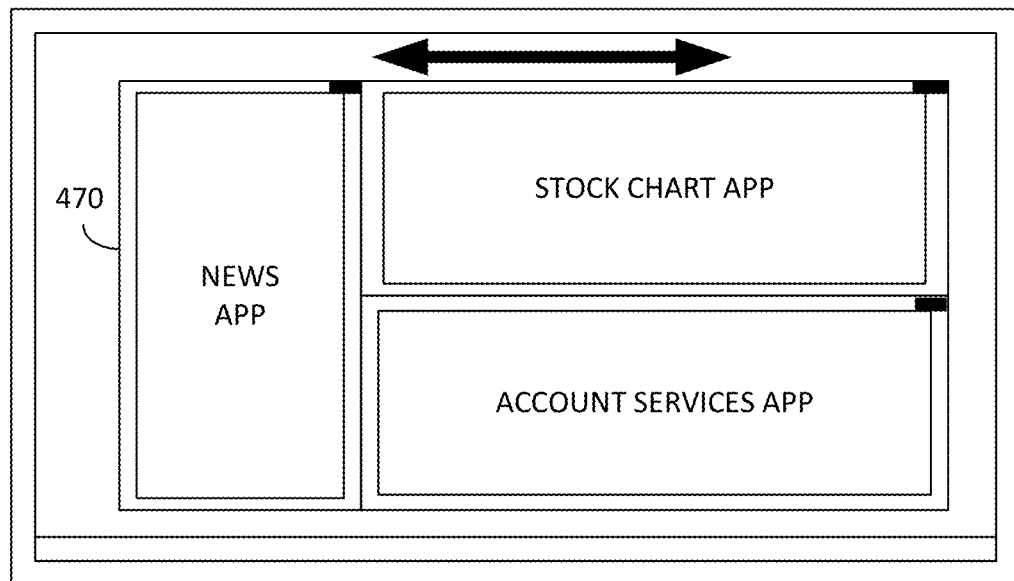

From a visual and user-interface perspective, the single window 470 offers additional benefits and functionality to the user. For example, FIG. 16A illustrates the user ability to modify window 470 by elongating the full window. This elongation can simultaneously elongate application 450, 452, and 454, accordingly.

Figure 16B:
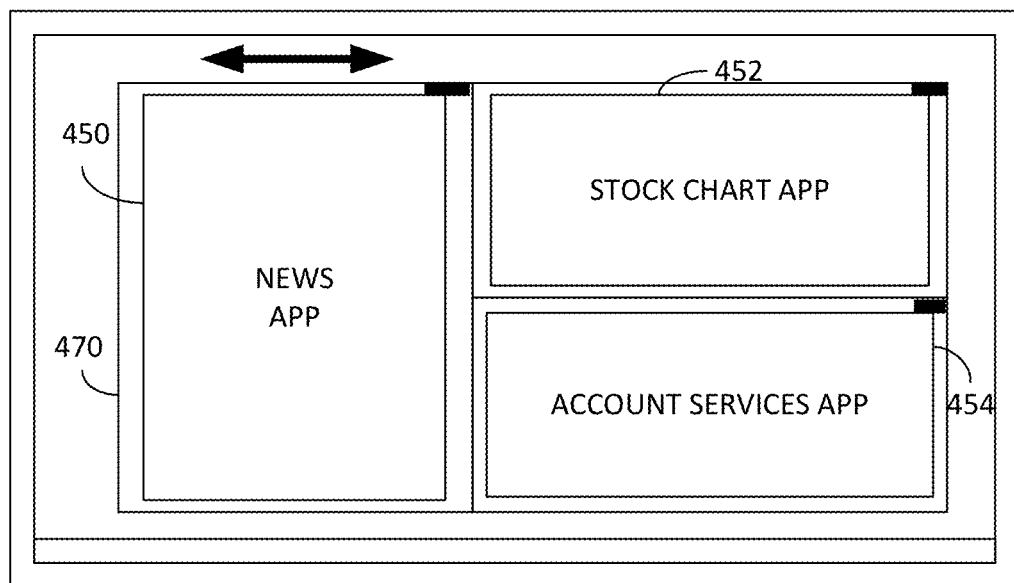

By contrast, FIG. 16B illustrates another modification of grouped window 470. The user can elongate just the news application 450, which accordingly narrows applications 452, 454 within the window 470 frame.

It is noted any one or more of the applications in windows 450, 452, and 454 may be a non-browser application as described above. Therefore, the grouping operations described herein, including both display and processing, are applicable to a non-browser application as well as browser applications. For example, upon grouping windows 450, 452, and 454, an update in the news application 450 by loading a news story about a specific company, could automatically generate the stock chart to be displayed in the application 452 and list a customer's share information in the account services application 454.

Figure 17A:
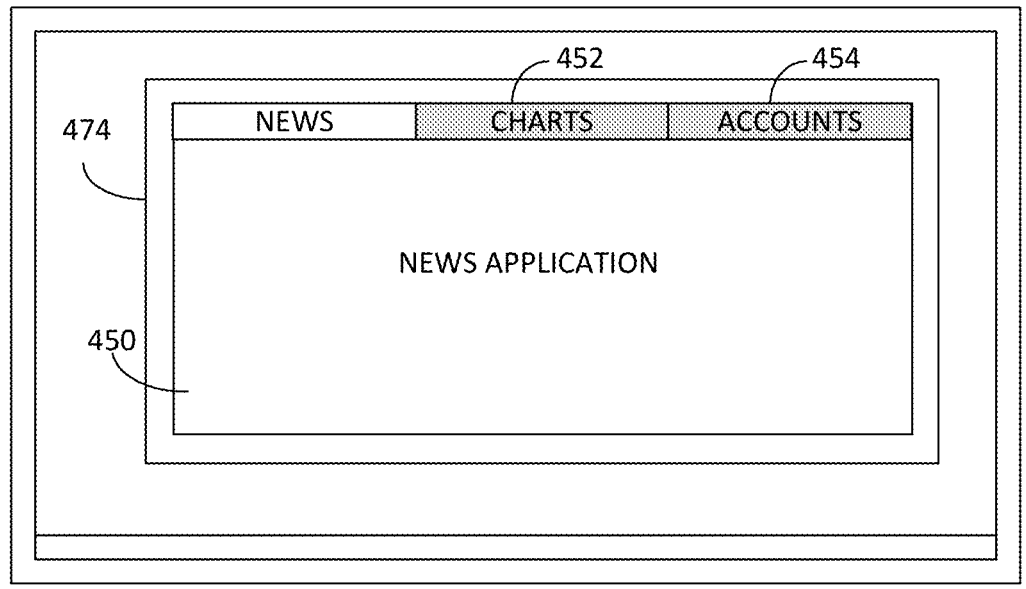
Figure 17B:
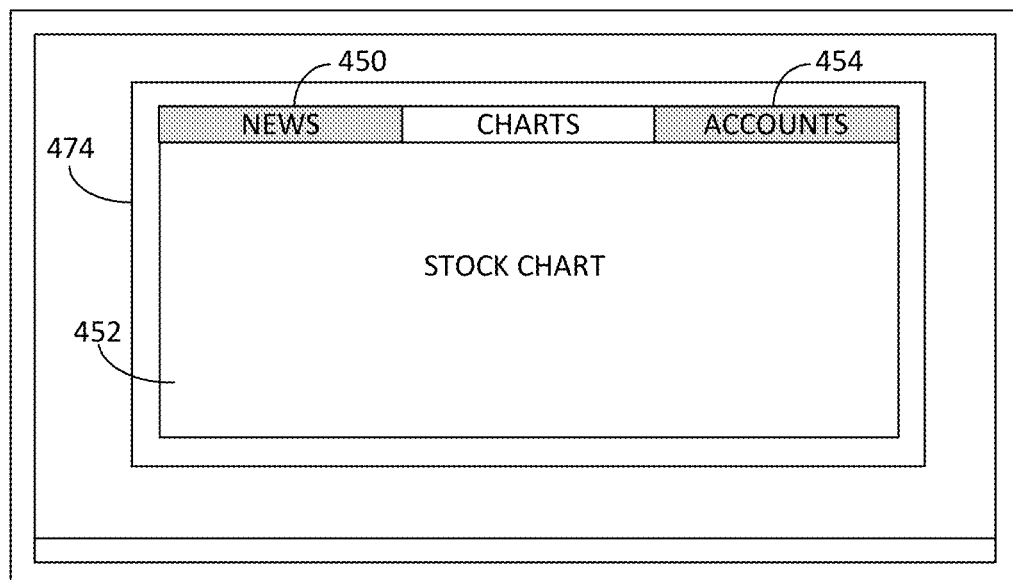

The inclusion of the microservices layer further allows for tabbing of separate applications into a user interface consistent with current tabbing displays found in modern browsers. Prior browser tabs suffer from the same secure sandbox prohibitions prohibiting communication from tabbed window to tabbed window. FIGS. 17A and 17B illustrate two sample user interface displays showing tabbed window displays. Similar to SDG above, tabbing operations are also applicable to non-browser applications assimilated into a browser application window.

In one embodiment, the user interface may include a graphical user interface or instruction, such as but not limited to a pull-down menu, menu bar button, a hotkey that allows a user to group multiple windows. These grouped windows can then be integrated into a tabbed display, as shown in FIGS. 17A and 17B. For example, a user presented with a display screen of FIG. 13 could select a tabbing command from a pull-down menu on the graphical user interface. From this pull-down menu, the user can select a color for designated tabbing of windows. The user can select multiple windows having a shared color and then instruct the user interface to group these windows into a single display, such as display 474 of FIG. 17A.

In this example, the single display 474 includes one focused application and two hidden applications based on the tabbed designation. FIG. 17A shows the news application 450 in-focus, with charts application and account application hidden. From a user interface perspective, the display is similar to existing tabbed browser technology.

FIG. 17B illustrates the display 474 where the charts application 452 is in-focus. Here, the news application and accounts application are hidden. Similar to grouping of tabbed windows, a user interface may additionally allow for un-grouping and un-tabbing of these windows, such as reverting back to the FIG. 13 display.

While the front-end display of FIGS. 17A and 17B mirror current tabbed technology, the inclusion of the microservices module, e.g. 152 of FIG. 2, allows for communication between applications. Thus, similar to the docking of multiple windows described above, tabbing also generates a processing interoperability between these applications. For example, when a user selects a company in the news applications 450, the stock chart can be retrieved by the chart application 452 and the user account information can be retrieved by the accounts application 454. The tabbing of windows 450, 452, and 454 integrate these three separate applications into a well-known display format with interoperability not previously available.

In addition to the above-described interoperability of multiple applications via the service module, the present method and system provides for interoperability improving emitter and receptor techniques. These techniques improve the interoperability and communication between applications, as well as improving functionality made available via the service layer (e.g. service layer 142 of FIG. 1).

Figure 18:
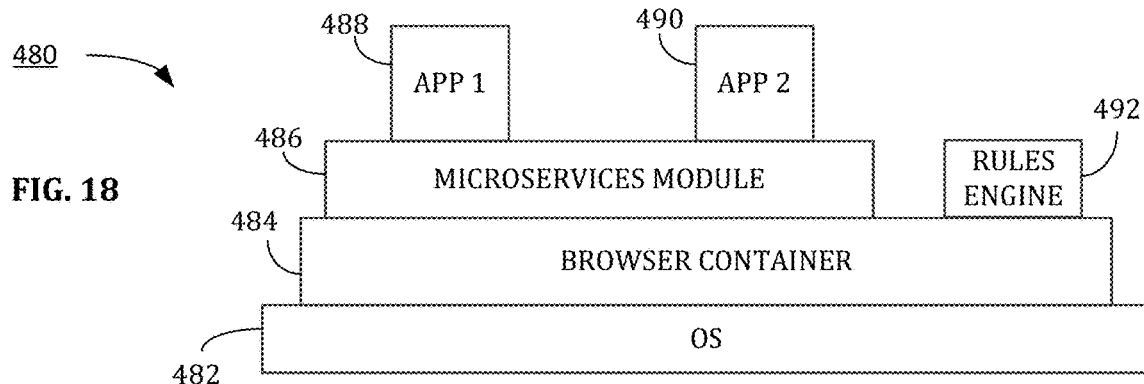
FIG. 18 illustrates one embodiment of a system for interoperability between applications.

FIG. 18 illustrates a processing system 480 enabling interoperability. The system 480 is similar to the system of FIG. 2 above, including an operating system 482 layer with a browser container 484 thereon. The microservices module 486 is disposed between the first application 488 and the second application 490, where the applications 488, 490 are mark-up language applications. The system 480 further includes a rules engine 492 facilitating interoperability as described herein.

The applications 488, 490 are similar to the applications 154, 156 of FIG. 2, including being mark-up language applications and including exchange scripts therein. Similarly, the microservices module 486 sits between the browser container 484 and the applications 488, 490.

The system 480 further includes the rules engine 492, which provides functionality as described herein. The rules engine 492 is a microservices module. The rules engine 492 is illustrated as a separate component for clarity purposes and to illustrate its position between the applications 488, 490 and the browser container 484. Therefore, the rules engine 492 may be disposed within the microservices module 486.

Figure 19:
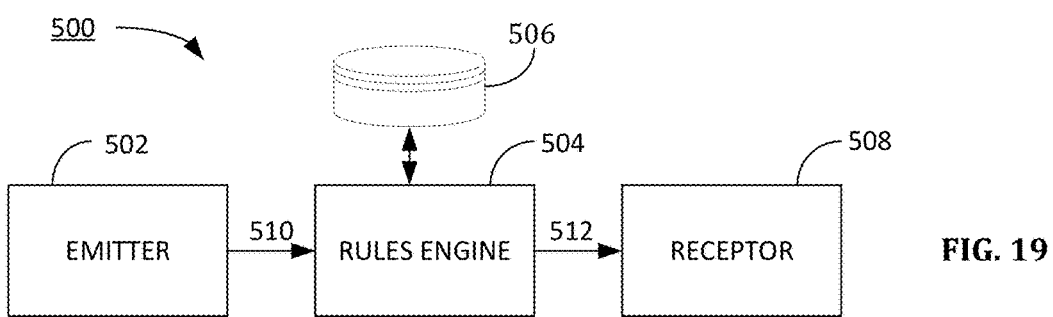
FIG. 19 illustrates a block diagram of the emitter/receptor model employed in the FIG. 18 system.

In one embodiment, the method and system uses one or more APIs to facilitate emitter and receptor functionality. FIG. 19 illustrates one embodiment of a system 500 providing for interoperability. The system 500 includes an emitter 502, a rules engine 504 with access to a rules database 506, and a receptor 508.

The emitter 502 may be any suitable component or service within the processing platform, such as the system 100 of FIG. 1. As described in greater detail below, the emitter 502 may also be a mark-up language application executing within a browser platform, such as application 488. The emitter 502 emits strands 510, where the strand 510 includes both a data field and a command field.

The rules engine 504 is an intermediate processing module that receives strands 510 and determines if there is a rule to be applied to the strand 510. The engine 504 reviews the strand 510 and then accesses the rule database 506. If the database 506 includes one or more rules, the rule is retrieved therefrom and applied to the strand 510.

Within the present invention, the rules engine database 506 may be populated with system-defined rules, as well as user-defined rules. Within normal processing operations may store rules within the database 506 for access by the engine 504. Moreover, the database 506 is not necessarily a unitary storage device, may be any suitable number of storage locations having rules stored therein.

The engine 504 generates a modified strand 512 based on a rule. The engine 504 then broadcasts this modified strand 512, where it is received by the receptor 508. Similar to the emitter 502, the receptor 508 may be any suitable component or service within the processing platform, such as the system 100 of FIG. 1. As described in greater detail below, the receptor 508 may also be a mark-up language application executing within a browser platform.

The receptor 508 therein converts the modified strand to an action command. In the example of the receptor 508 being the application 490, the application may perform a processing operation based thereon.

Within the present method and system, the processing of strands may be subject to conditional statements as well as transformations. As part of the rule system, conditional rules allow for system-wide distribution of strands and conditional statements allowing for strand transformation. Thus, rules can define these conditional statements and transformations providing additional interoperability between applications. Moreover, the processing of strands does not necessarily require transformations, as original strands may be used as instructions or further routed as necessary. For example, a user-generated set of rules for a third-party application running in the browser container facilitates interoperability with other applications.

Figure 20:
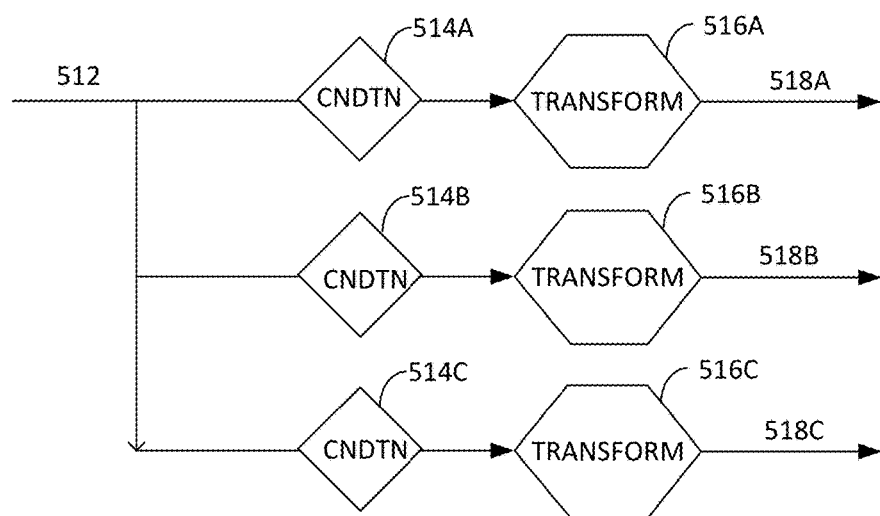
FIG. 20 illustrates a data flow diagram for processing a strand.

By way of example, FIG. 20 illustrates a data flow diagram representing multiple embodiments for processing a strand 512. The strand 512 is received by a first condition 514A. If the condition 514A met, the strand is subject to a transformation 516A. This transformation 516A generates a first outgoing strand 518A. This first strand 512 is further subject a second condition 514B, which if met then allows transformation 516B to generate the second outgoing strand 518B. A third condition 514C and a third transform 516C can also generate a third outgoing strand 518C.

These conditions and transforms may be disposed in various receptors. Where FIG. 20 illustrates how a single strand 512 can be transformed in any number of different strands 518, if desired by the receptor.

Figure 21:
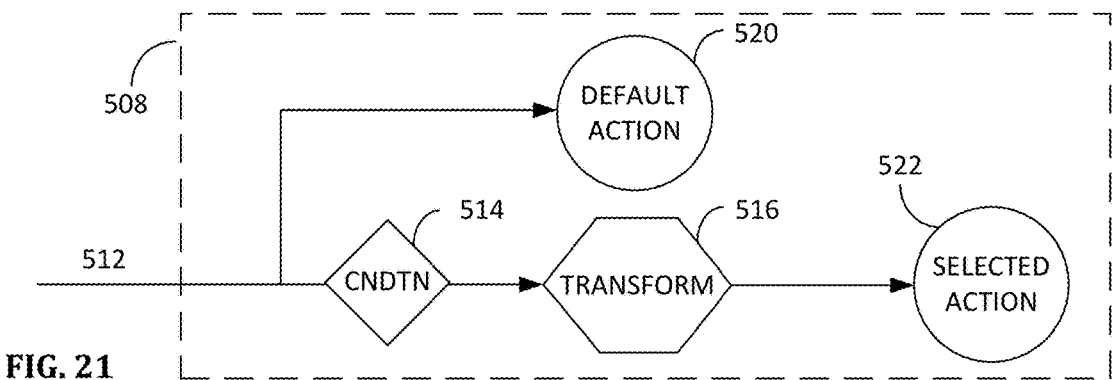
FIG. 21 illustrates a data flow diagram for a receptor operation.

FIG. 21 illustrates an exemplary embodiment of the receptor 508 of FIG. 19. Upon receipt of the modified strand 512, the receptor 508 generates an action command using a transform command 516. In one embodiment, the transform command could be a null command, relying on the original modified strand 512. This generates an action command which is a default action 520. Where the transform command 516 changes the modified strand 512, the transform command 516 generated the selected action 522.

This method and system allows usage of general strands, where specific strands do not need to be unique to specific receptors. Strands may include more than one key and keys are hierarchical, which allows for restrictive or inclusive access to these one or more keys.

A strand contains one or more keys ordered with increasing specificity. A "key" is simply a string, and so a strand is essence an ordered list of strings. An exemplary taxonomy of "native" types provide the building blocks for strands, such as:

"word"—A text string without spaces.
"phrase"—A text string with multiple words.
"image"—An image of any sort.
"object"—An object with nested hierarchy.
"list"—A list of objects.
"grid"—A two-dimensional array of objects.

With these basic types, an application can emit a strand (for example, when beginning a drag and drop operation) while another application can advertise a receptor for that strand as outlined in the following pseudocode:

sendingAppl.emit("word","breathless");
receivingAppl.receptor("word", function(word)){output (word)}

The protocol does not define a transport, relying on intermediary layers of code to send and receive messages as well as to implement discovery for advertising receptors. For instance, within a single application, two components might accomplish data transfer using drag and drop. Applications running on a single machine might use an interop relay. Between desktops, strands might be delivered via a chat network.

In one embodiment, strands contain a sequence of keys. For example, consider an embodiment provide for the transfer of market data:

emit("word:symbol", "IBM")—This represent a stock symbol. An application such as a quote board might emit this strand. The strand itself could be accepted by receptors that accept stock symbols, as well as receptors that accept any word:

receivingAppl.receptor("word:symbol", cb)—This would only accept exact matches on the strand (sequence). For instance, a chart application could accept this to display a chart for the requested symbol.

receivingApplication.receptor("word", cb)—This receptor accepts any word, so it could also accept the stock symbol but would treat it as simple text. For instance, a chat application might accept this.

An application could also emit multiple strands:
emit({"word:symbol":"IBM","word:cusip": A1232323})—This emits two strands as a single package. Receptors for either strand would receive the data for the respective strand.

receivingAppl.receptor("word:cusip", cb); —Would receive "A1232323"
receivingAppl.receptor("word:symbol", cb); —Would receive "IBM"

In one embodiment, this allows third-parties to implement their own protocols via namespacing:

emit("word:thomson:ric")—Emits a Thomson proprietary RIC code.
emit("word:symbol:thomson:ric")—Emits a Thomson proprietary RIC code but with the intention of allowing applications that accept "string:symbol" to opt in. The increasing specificity then becomes informational rather than a gate.

With the ability for vendors to namespace, standards can be safely defined for common data types:
emit("word:account")—An account number
emit("word:userid")—A user ID
emit("phrase:headline")—Headline for a news article
emit("phrase:tweet")—A message under 160 characters
emit("phrase:html")—An html block
emit("phrase:chat:symphony")—A chat message from the Symphony network
emit("phrase:symphony:chat")—A chat message specifically *in Symphony protocol*
emit("list:word:symbol")—A list of symbols
emit("image:jpeg")—A jpeg image
emit("grid:word")—A two dimensional array of words
emit("object:standardX123:trade")—A generic trade as defined by an industry standard
emit("object:chartiq:chart")—A complex object that is proprietary to a specific vendor The simple nature of strands allows them to be transported across nearly any layer in the processing platform. Encoding can likewise be left to higher layers. That said, strands are designed as a user interface interoperability protocol. Web standards such as UTF-16 and base64 encoding (for binary data) can be articulated as de facto standards while allowing additional layers to translate data to other form factors when necessary.

Likewise, no protocol envelope is specifically required. Strands may be transmitted through function calls as over a network. The simple nature of strands would allow them to be packaged into any envelope (XML, FIX, etc) and intermediary layers could be relied upon to handle format conversion.

With reference back to FIG. 19, the rules engine 504 supports both inter-application data exchange and inter-application control. The strand 510 includes both at least one data field and at least one command field. As noted above, a strand may include a rule to modify the strand, or no rule (or by extension a rule that indicates no modification).

Figure 22:
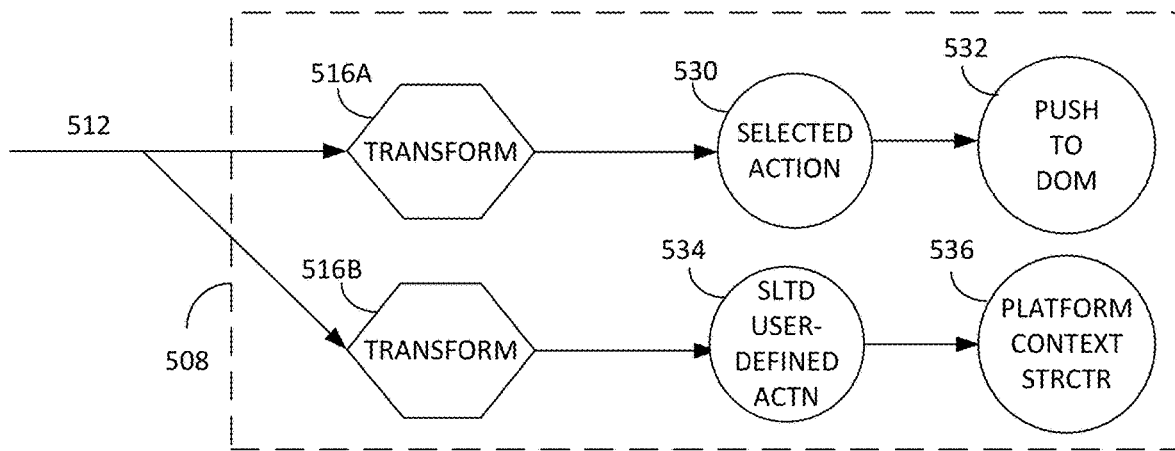
FIG. 22 illustrates a data flow diagram for a receptor operation.

In FIG. 21, upon meeting conditional 514, the transform command 516 transforms the strand 512 to an action command for a selected action 522. For example, in one embodiment the transform action may be changing the formatting of the selected action relative to the receptor. FIG. 22 illustrates varying embodiments of selected actions relative to the transform command 516.

The present method and system, in this embodiment via the rule engine 504, allows for users to create their own customized integration between components. By establishing rules associated the data field and/or command field, single emitter strands can be perpetuated amongst a large number of receptors, with different results (actions) for different receptors.

Users may create customized integrations by supporting user-define strands and user-defined actions. One embodiment may include direct mappings to and from a document object model (DOM) associated with the mark-up language encoding. Customized integrations can be created using an interactive tool, pulling data from HTML/DOM and allowing a user to define mappings. These mappings can be imported into the rules engine.

A DOM is an API for mark-up language documents, defining logical structures of the document, as well as means for accessing and manipulating the document. Users may be able to build documents, navigate the document structure, add, modify, or delete elements and content using the DOM. Therefore, where the present emitter and receptor are elements within a processing platform run a browser platform and mark-up language applications, direct mappings to a DOM thereby directly translates to functionality and interoperability.

With respect to FIG. 22, a transform command 516a can generate a selected action 530 for pushing to the DOM 532.

In another embodiment allowing interoperability, the present method and system can integrate with a governing workflow solution, also referred to as a platform context structure. For example, one embodiment may include a Financial Desktop Connectivity and Collaboration Consortium (FDC3) workflow solution.

Via the rules engine, a transform command 516b can generate a selected action 534 for direct mapping to the FDC3 workflow solution 536. In this embodiment, the mapping may be to the FDC3 content plus the intent plus the data messages. The FDC3 intents define a standard set of nouns and verbs that can be used to put together common cross-application workflows.

The present method and system, as part of the interoperability, generates an operational function within the receptor. This operational function varies depending on the receptor itself. For example, if the receptor is an application, the operational function may be changing a value or output in the application, such as a display screen modification.

The receptor may be any suitable component or service, therefore the operational function of the receptor could be generating another emitter for a cascading result of numerous operations.

Figure 23:
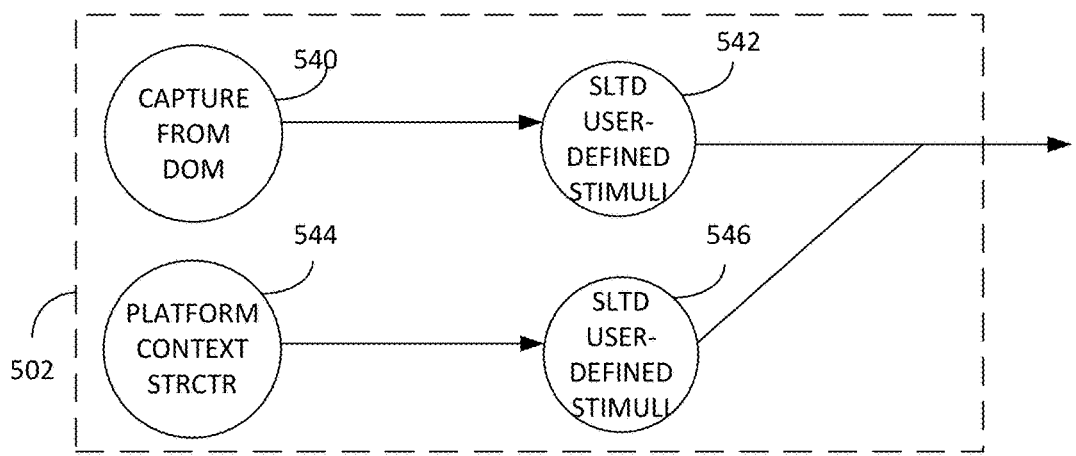
FIG. 23 illustrates a data flow diagram for an emitter operation.

FIG. 23 illustrates a further embodiment of the emitter 502 from the system 500 of FIG. 19. As part of the emitting processing, the emitter receives a triggering event. For example, action 540 is the capturing of an action command relating to the DOM. This generates an action 542 received by the emitter 502 for continuing the emitter-receptor process.

In another embodiment, the platform context structure action 544 can trigger action 546 received by the emitter 502.

Figure 24:
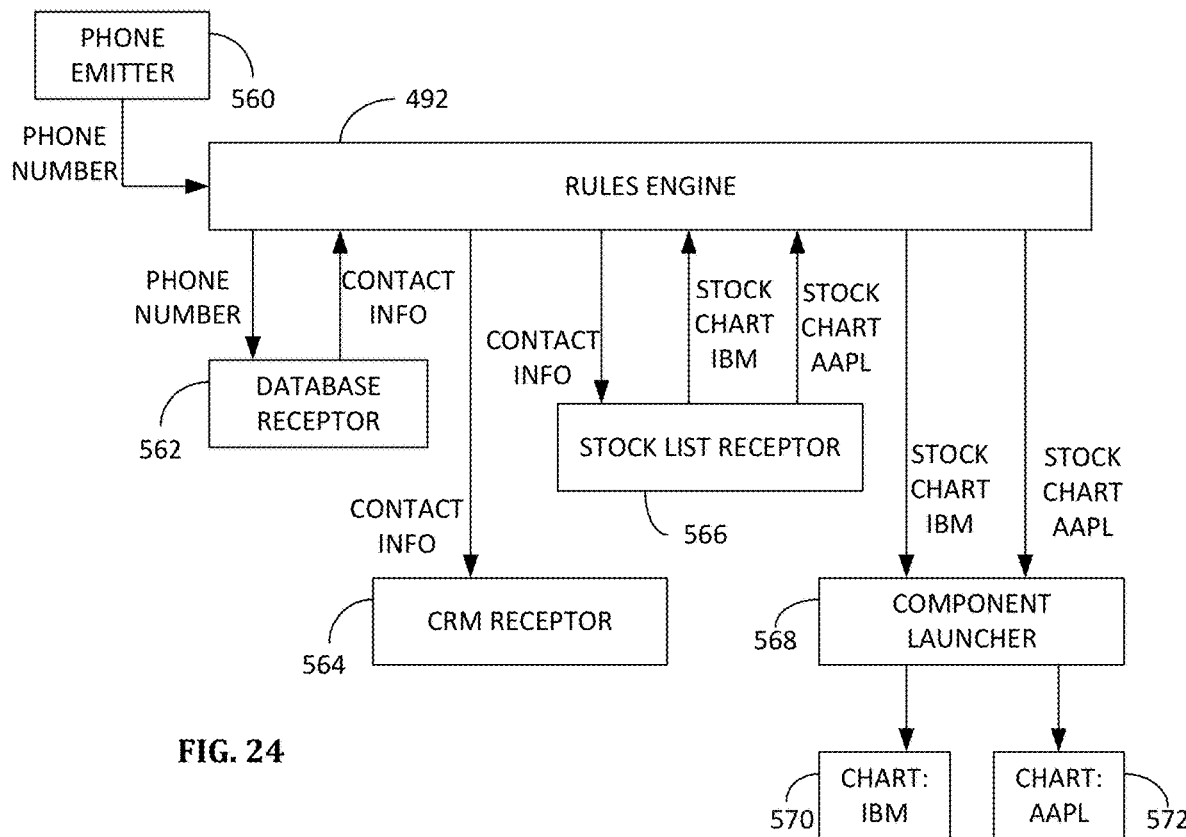
FIG. 24 illustrates a graphical representation of one embodiment of a rules engine implementation.

FIG. 24 illustrates an exemplary embodiment of the rules engine enabling interoperability between mark-up language applications running in browser containers. The rules engine 492 is disposed within the microservices layer as described herein.

In this exemplary embodiment, a phone application 560 acts as the emitter, emitting a strand that includes a phone number. The rules engine 492 receives strand and applies a rule to the strand. In this example, one rule may be to access a database receptor 562, a customer relations management (CRM) receptor 564, and a stock list receptor 566, and then finally a component launcher 568.

The rules engine 492 provides the strand to the database receptor 562, receiving contact information in response. For example, if the phone number is a 10-digit telephone number, the contact information may be full address and account information.

The rules engine 492 then provides the contact information to CRM receptor 564 and the stock list receptor 566. The CRM receptor 564 may process the strand for CRM tracking functions. The stock list receptor 566 can utilize the account information within the contact information to detect the person associated with the phone number holds stock in IBM and Apple (AAPL). The receptor 566 can then following the instructions to emit stock chart information for IBM and for Apple to the rules engine 492.

The engine 492, following a rule can then emit stock chart information to the launcher 568, which generates stock charts for IBM and AAPL on one or more stock charting applications 570, 572 respectively.

Figure 25:
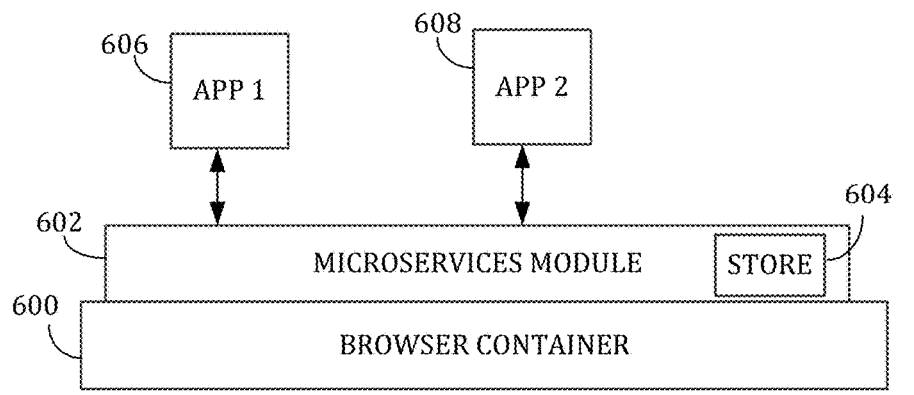
FIG. 25 illustrates a processing system for providing a distributed store between applications.

FIG. 25 illustrates one embodiment of a system providing for interoperability of applications. The system includes the browser container 600, which is executable on an operating system. The browser container 600 supports a microservices layer 602 having a data store 604 therein. The first application 606 and the second application 608 are executable within the browser container, as discussed in greater detail above.

FIG. 25 illustrates the processing programs/modules executable within a computing environment. The system in FIG. 25 enables, on a display device, interoperability of the first application 606 in a first browser window and the second application 608 in a second browser window. Therefore, as used herein, windows also refers the application, such as applications 606, 608.

A data store, as used herein, is a mechanism for state management and simplifies building a user interface including using a data store field. The data store solves a one to many state management complexity and has benefits from being unidirectional. A data store with a data store field is set in a unidirectional manner, but notifications regarding changes are broadcast to one or more listeners. The present data store improves over prior techniques by being shareable and workable across window boundaries. The data store field, herein, includes a key value pair.

Components can leverage the distributed data store to side-step explicit dependencies. It is noted that some components may not utilize the data store, or may partly use the data store and have other dependencies through the router. Components in this architecture can be designed so that they depend only on a shared data model. Herein the distributed data store enables interoperability between multiple browser applications in unique browser windows through the central disposition of the distributed data store and its data store field value through the microservices module.

Data stores are used to save and retrieve data either locally or globally. You can add listeners at multiple levels or at an individual attribute level within the stores values and get the updated data as it is updated in the data store.

The method and system includes various processing operations for the data store, including creating, storing, accessing, deleting, etc. The method and system also utilizes listeners to help monitor stores, including distributing/routing stores, including data store fields, as necessary.

In one embodiment, the data store supports database transactions. For example, one client of the distributed data store can lock store access until a set of transactions are completed. This embodiment can then insure store consistency across multiple fields.

Part of the distributed store is the routing of messages within the microservices module.

In one embodiment, the distributed data store can utilize a listen/transmit model. A component can set a listener request with the store 604. This listener request instructs the store 604 to transmit a notification when the store has changed value. More specifically, a transmit event is duplicated by the Router Service and sent to each of the corresponding listeners, whose callback is then invoked with the transmit data.

The router operations may be in accordance with known router techniques. The utilization of the distributed data store within the microservices facilitates an improved interoperability between multiple windows in one or more displays. The distributed data store facilitates harmonizing data amongst multiple applications via the microservices layer using a global store.

FIGS. 1 through 25 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A method for interoperability between a first application and a second application, where both the first application and the second application are mark-up language applications executable within a browser container executing on a processing device, the method comprising:
    accessing a first exchange script in the first application and a second exchange script in the second application;
    executing the first application and the second application on the processing device;
    executing a microservices module in communication with the first application and the second application, the microservices module disposed on the processing device between the first application and the browser container and between the second application and the browser container;
    based on an interaction between the first application and the microservices module, emitting a strand, wherein the strand includes both a data field and a command field;
    accessing a rules engine to determine at least one rule associated with the strand;
    generating a modified strand based on the at least one rule and broadcasting the modified strand to the second application via the second exchange script;
    converting the modified strand to an action command and performing a processing operation in the second application on the processing device based on the action command.

2. The method of claim 1, wherein the strand is emitted from at least one of: the first application, the microservices module, and a component associated with the browser container.

3. The method of claim 1, wherein the modified strand is received by at least one of: the second application, the microservices module, and a component associated with the browser container.

4. The method of claim 1, wherein the action command is a default action defined by the rule accessed through the rules engine.

5. The method of claim 1 further comprising:
    receiving and storing a user-defined action command; and
    generating the modified strand based on the user-defined action command.

6. The method of claim 1 further comprising:
    mapping the action command to a document object model associated with the second application.

7. The method of claim 6, wherein the second application is a financial services application, the method further comprising:
    bridging the action command to a financial services workflow solution governing the second application.

8. A method for interoperability of a first application and a second application, where both the first application and the second application are mark-up language applications executable within a browser container, the method comprising:
    accessing a first exchange script in the first application and a second exchange script in the second application;
    executing the first application and the second application on the processing device;
    executing a microservices module in communication with the first application and the second application, the microservices module disposed on the processing device between the first application and the browser container and between the second application and the browser container;
    communicating between the first application and the microservices module using the first exchange script and communicating between the second application and the microservices module using the second exchange script;
    storing a data store field within the microservices module, the data store field including a key/value pair;
    upon modification of the data store field, routing a modified data store field to at one of the first application and the second application.

9. The method of claim 8 further comprising:
    receiving a listener instruction associated with the data store field.

10. The method of claim 9 further comprising:
    setting the listener instruction with the first store data field in the microservices module; and
    upon modification of the data store field, routing the modified data store field based on the listener instruction.

11. A system for interoperability between a first application and a second application, where both the first application and the second application are mark-up language applications executable within a browser container, the method comprising:
    a storage device having executable instructions stored therein; and
    a processing device, in response to the executable instructions, operative to:
    access a first exchange script in the first application and a second exchange script in the second application;
    execute the first application and the second application on the processing device;
    execute a microservices module in communication with the first application and the second application, the microservices module disposed between the first application and the browser container and between the second application and the browser container on the processing device;
    based on an interaction between the first application and the microservices module, emit a strand, wherein the strand includes both a data field and a command field;
    access a rules engine to determine at least one rule associated with the strand;
    generate a modified strand based on the at least one rule and broadcasting the modified strand to the second application via the second exchange script;
    convert the modified strand to an action command and performing a processing operation in the second application on the processing device based on the action command.

12. The system of claim 11, wherein the strand is emitted from at least one of: the first application, the microservices module, and a component associated with the browser container.

13. The system of claim 11, wherein the modified strand is received by at least one of: the second application, the microservices module, and a component associated with the browser container.

14. The system of claim 11, wherein the action command is a default action defined by the rule accessed through the rules engine.

15. The system of claim 11, wherein the processing device is further operative to:
   receive and store a user-defined action command; and
   generate the modified strand based on the user-defined action command.

16. The system of claim 11, wherein the processing device is further operative to:
   map the action command to a document object model associated with the second application.

17. The system of claim 16, wherein the second application is a financial services application, the processing device further operative to:
   bridge the action command to a financial services workflow solution governing the second application.

* * * * *